(12) United States Patent
Corum

(10) Patent No.: US 8,310,093 B1
(45) Date of Patent: Nov. 13, 2012

(54) MULTIPLY-CONNECTED POWER PROCESSING

(76) Inventor: James F. Corum, Morgantown, WV (US)

( * ) Notice: Subject to any disclaimer, the term of this patent is extended or adjusted under 35 U.S.C. 154(b) by 519 days.

(21) Appl. No.: 12/437,041

(22) Filed: May 7, 2009

Related U.S. Application Data

(60) Provisional application No. 61/051,388, filed on May 8, 2008.

(51) Int. Cl.
*H02J 1/10* (2006.01)
(52) U.S. Cl. .......................................... 307/43
(58) Field of Classification Search .................. 307/43
See application file for complete search history.

(56) References Cited

U.S. PATENT DOCUMENTS

| | | | |
|---|---|---|---|
| 3,012,203 A | 12/1961 | Ping | |
| 3,300,728 A | 1/1967 | Adler | |
| 3,435,342 A | 3/1969 | Burnsweig et al. | |
| 3,501,164 A | 3/1970 | Peterson | |
| 3,631,534 A | 12/1971 | Hirota et al. | |
| 3,663,948 A | 5/1972 | Nagae et al. | |
| 3,771,077 A | 11/1973 | Tischer | |
| 3,824,496 A * | 7/1974 | Hekimian | 331/132 |
| 3,829,881 A | 8/1974 | Kohashi | |
| 4,009,444 A | 2/1977 | Farkas et al. | |
| 4,327,330 A | 4/1982 | Ranghelli | |
| 4,467,269 A | 8/1984 | Barzen | |
| 4,622,558 A | 11/1986 | Corum | |
| 4,749,950 A | 6/1988 | Farkas | |
| 4,751,515 A | 6/1988 | Corum | |
| 5,396,188 A * | 3/1995 | Aoki | 327/552 |
| 5,406,237 A | 4/1995 | Ravas et al. | |
| 5,633,648 A | 5/1997 | Fischer | |
| 5,748,295 A | 5/1998 | Farmer | |
| 5,949,311 A | 9/1999 | Weiss et al. | |
| 6,121,693 A | 9/2000 | Rock | |
| 6,459,247 B1 | 10/2002 | Benes | |
| 6,522,030 B1 | 2/2003 | Wall et al. | |
| 6,611,181 B2 | 8/2003 | Marketkar et al. | |
| 6,653,821 B2 | 11/2003 | Kern et al. | |
| 6,653,827 B2 | 11/2003 | Gaither et al. | |
| 6,654,216 B2 | 11/2003 | Horvath et al. | |
| 6,788,163 B2 | 9/2004 | Benham et al. | |
| 6,990,327 B2 | 1/2006 | Zheng et al. | |
| 7,033,406 B2 | 4/2006 | Weir et al. | |
| 7,050,913 B2 | 5/2006 | Cox | |
| 7,583,143 B2 | 9/2009 | Pan | |
| 2002/0149535 A1 | 10/2002 | Toncich | |

(Continued)

FOREIGN PATENT DOCUMENTS

CA 1186049 4/1985

(Continued)

OTHER PUBLICATIONS

Churchill, R.V., Complex Variables and Applications, 1960, pp. 111-112, McGraw-Hill, New York.

(Continued)

*Primary Examiner* — Rexford Barnie
*Assistant Examiner* — Hal Kaplan
(74) *Attorney, Agent, or Firm* — Thomas, Kayden, Horstemeyer & Risley, LLP

(57) ABSTRACT

Various power processing systems are described that employ a multiply-connected velocity inhibiting circuit. At least one active circuit is employed to synthesize at least one passive lumped element in the multiply-connected velocity inhibiting circuit.

32 Claims, 19 Drawing Sheets

U.S. PATENT DOCUMENTS

| | | | |
|---|---|---|---|
| 2006/0190511 A1* | 8/2006 | Corum | 708/200 |
| 2006/0190512 A1 | 8/2006 | Corum | |
| 2006/0190513 A1 | 8/2006 | Corum | |
| 2006/0212176 A1 | 9/2006 | Corum | |
| 2008/0185916 A1 | 8/2008 | Corum et al. | |
| 2008/0186646 A1 | 8/2008 | Corum | |

FOREIGN PATENT DOCUMENTS

| | | |
|---|---|---|
| EP | 0043591 | 1/1982 |
| SI | 152491 | 11/1955 |
| WO | 96/36105 | 11/1996 |

OTHER PUBLICATIONS

Guillemin, The Mathematics of Circuit Analysis, MIT Principles of Electrical Engineering Series, 1949, pp. 221-223, MIT Press, Cambridge.

IEEE Standard Dictionary of Electrical and Electronics Terms, F. Jay, editor, 2nd edition, 1977, p. 644, Wiley-Interscience, New York.

Kellogg, O.D., Foundations of Potential Theory, 1953, p. 74, Dover, New York.

Morse, P.M. et al., Methods of Theoretical Physics, 1953, p. 363, McGraw-Hill, New York.

Second Declaration of Dr. James F. Corum submitted in U.S. Appl. No. 11/751,343 on Feb. 1, 2011.

Schelkunoff, S.A., Applied Mathematics for Engineers and Scientists, Bell Laboratories Series in Electrical Engineering, 1965, pp. 302-304, Van Nostrand Reinhold, Co., New York.

Sokolnikoff, I.S., Advanced Calculus, 1939, pp. 184, 192-195, McGraw-Hill, New York.

Spiegel, M.R., Advanced Calculus, Schaum's Outline Series, 1963, pp. 102, 197, 204-205, Schaum Publishing Co., New York.

Spiegel, M.R., Vector Analysis, Schaum's Outline Series, 1959, pp. 109-110, 112-113, Schaum Publishing Co., New York.

Stratton, J.A., Electromagnetic Theory, 1941, p. 227, McGraw-Hill, New York.

Torre, E. Della et al., The Electromagnetic Field, Allyn and Bacon Series in Electrical Engineering, 1969, p. 132, Allyn and Bacon, Inc., Boston.

Adler, R.B., L.J. Chu, and R.M. Fano, *Electromagnetic Energy Transmission and Radiation*, Wiley, 1960, p. 31-32.

Collin, R.E., Foundations for Microwave Engineering, McGraw-Hill, 1966, pp. 80-89, 144-197.

Comm, J.F. and K.L. Corum, "RF Coils, Helical Resonators and Voltage Magnification by Coherent Spatial Modes," Microwave Review, Sep. 2001, pp. 36-45.

Corum, J.F., "A Concentric Array for Low and Medium Frequencies," 1990 IEEE Antennas and Propagation Society International Symposium Digest, Dallas, Texas, May 1990, vol. 2, pp. 832-835.

Corum, J.F., "A Novel Structure for Improved Directivity," Proceedings of the 1988 IEEE Antennas and Propagation Society International Symposium, Syracuse, New York, Jun. 1988, pp. 824-827.

Corum, J.F., "Experimental Validation of the Improved Directivity Element—Elevation Plane Control," Proceedings of the 1989 IEEE Antennas and Propagation Society International Symposium, San Jose, California, 1989, pp. 702-705.

Corum, J.F., "Toroidal Helix Antenna," Proceedings of the 1987 IEEE Antennas and Propagation Society International Symposium, Blacksburg, VA., Jun. 1987, pp. 832-835).

Corum, J.F., "Vehicular Wide-Band Antenna System," Tactical Warfare Simulation and Technology Information Analysis Center, Battelle Memorial Institute, Final Report, US Army Missile Command Contract No. DAAH01-91-D-R006, Jun. 30, 1993, pp. 1-41.

Corum, J.F., B.F. Pinzone, and K.L. Corum, "A New Low Profile AntiSkywave Antenna for AM Broadcasting," Proceedings of the 1988 National Association of Broadcasters (NAB) 42nd Engineering Conference, Las Vegas, Nevada, Apr. 1988, pp. 7-15.

Corum, J.F., B.F. Pinzone, and K.L. Corum, "Antiskywave Antenna Design," Radio World, May 15, 1988, pp. 45-46.

Corum, K.L. and J.F. Corum, "Tesla and the Magnifying Transmitter," Proceedings of the 1992 International Tesla Symposium, International Tesla Society, 1992, pp. 55-78.

IEEE Standard Dictionary of Electrical and Electronics Terms, McGraw-Hill, second edition, 1977, p. 391.

Johnson, W.C., Transmission Lines and Networks, McGraw-Hill, 1950, pp. 117-120.

Nourai, A. "Comparison of the Costs of Energy Storage Technologies for T&D Applications", American Electric Power, downloaded from www.electricitystorage.org, Jul. 2004, pp. 1-30.

Paris, D.T. and F.K. Hurd, Basic Electromagnetic Theory, McGraw-Hill, 1969, pp. 512-527.

Terman, F.E., Radio Engineering Handbook, McGraw-Hill, 1943, pp. 172-178, 191-215.

Statement Submitted under 37 CFR § 1.56 (8 pages) with Attached Declaration of Dr. James F. Corum (4 pages), Dec. 2009.

Alexanderson, E.F.W., "A Magnetic Amplifier for Radio Telephony," Proceedings of the IRE, vol. 4, Apr. 1916, pp. 101-120.

Balakin, A. B., "A new approach to the detection of gravitational waves," American Institute of Physics, pp. 183-184, Feb. 1991.

Barrow, W.L., "Frequency Modulation and the Effects of a Periodic Capacity Variation in a Nondissipative Oscillatory Circuit," Proc. IRE, vol. 21, 1933, pp. 1182-1202.

Barrow, W.L., "On the Oscillations of a Circuit Having a Periodically Varying Capacitance," Proc. IRE, vol. 22, 1934, pp. 201-212.

Barrow, W.L., D.B. Smith and F.W. Baumann, "A Further Study of Oscillatory Circuits Having Periodically Varying Parameters—Part I," Jour. Franklin Institute, vol. 221, 1936, pp. 403-416.

Barrow, W.L., D.B. Smith and F.W. Baumann, "A Further Study of Oscillatory Circuits Having Periodically Varying Parameters—Part II," Jour. Franklin Institute, vol. 221, 1936, pp. 509-529.

Beckman, P., "Einstein Plus Two," The Golem Press, CO, Chapter 1.12, "Radiation and Some Other Matters", pp. 156-162, 1987.

Benahmend, N. et al., "Finite Element Analysis of RF Couplers with Sliced Coaxial Cable," Microwave Journal, pp. 106, 113-114, 116, 118, 120, Nov. 2000.

Bennett, W.R., "A General Review of Linear Varying Parameter and Nonlinear Circuit Analysis," Proc. IRE, vol. 38, 1950, pp. 259-263.

Bennett, W.R., "Amplification in Nonlinear Reactive Networks," IRE Transactions on Circuit Theory, vol. CT-7, Dec. 1960, pp. 440-446.

Blair, D.G., et al, "High Sensitivity Gravitational Wave Antenna with Parametric Transducer Readout," Phys. Rev. Letters, vol. 74, Mar. 13, 1995, pp. 1908-1911.

Bloom, S. and K.K.N. Chang, "Parametric Amplification Using Low-Frequency Pumping," Journal of Applied Physics, vol. 29, 1958, p. 594.

Bloom, S., and K.K.N. Chang, "Theory of Parametric Amplification Using Nonlinear Reactances," RCA Review, vol. 18, Dec. 1957, pp. 578-593.

Carlson, A.B., Communication Systems, McGraw-Hill, second edition, 1975, p. 187-188.

Chiang, Yi-Chyun, et al., "Design of a Wide-Band Lumped-Element 3-dB Quadrature Coupler," IEEE Transactions on Microwave Theory and Techniques, pp. 476-479, Mar. 2001.

Corum, J.F., "The Electromagnetic Stress-Tensor As a Possible Space Drive Propulsion Concept," 37th AIAA/ASME/SAE/ASEE JPC Conference and Exhibit, Salt Lake City, Utah, Jul. 2001, pp. 1-11.

Cullen, A.L., "A Traveling Wave Parametric Amplifier," Nature, vol. 181, Feb. 1, 1958, p. 332.

Cunningham, W.J., Nonlinear Systems, McGraw-Hill, 1958, pp. 259-280.

Faraday, M., "On a Peculiar Class of Acoustical Figures; and on Certain Forms Assumed by a Group of Particles upon Vibrating Elastic Surfaces," Philosophical Transactions of the Royal Society, London, vol. 121, May 1831, pp. 299-340.

Franke, E., "Capacitively Coupled Hybrids," Ham Radio, pp. 70-78, Mar. 1983.

Gorelik, G., Resonance Phenomena In Linear Systems With Periodic Parameters, Technical Physics of the USSR, Leningrad, 1935, vol. 2, No. 2-3, pp. 135-180.

Hartley R.V.L., "Oscillations with Non-linear Reactances," Bell System Technical Journal, vol. 15, No. 3, Jul. 1936, pp. 424-440.

Hayes, P.S. and R.A. Surette, "Methods of Producing High Levels of RF Power for Test Purposes," Proceedings of the 1988 National Association of Broadcasters (NAB) 42nd Engineering Conference, Las Vegas, Nevada, Apr. 1988, pp. 380-386.

Hussey, L.W. and Wrathall, L.R., "Oscillations in an Electromechanical System," Bell System Technical Journal, vol. 15, No. 3, Jul. 1936, pp. 441-445.

Karasev, M.D., "Some General Properties of Nonlinear Reactive Elements," Soviet Physics Uspekhi, vol. 67 (2), No. 5, Oct. 1959, pp. 719-748.

Kharkevich, A.A., Nonlinear and Parametric Phenomena in Radio Engineering, translated by J.G. Adashko, John F. Rider Publishers, 1962, pp. 166-176.

Kuecken J. A, "Antennas and Transmission Lines," Howard W. Sams & Co., New York, Chapter 23, pp. 149-159, 1969.

Landon, V.D., "The Use of Ferrite-Cored Coils as Converters, Amplifiers, and Oscillators," RCA Review, vol. 10, 1949, pp. 387-396.

Lazarev, V.A., "On Hetero-Parametric Excitation," Zhurnal Teknicheskoi Fiziki, vol. 3, 1934, pp. 30-48 (Translation by Peter J. Pesavento available on the internet at http://nedyn.com/translations.html].

Lombardo, P.P., and E.W. Sard, "Low Frequency Prototype Traveling-Wave Reactance Amplifier," Proceedings of the IRE, vol. 47, 1959, pp. 990-1005.

Lord Rayleigh (J.W. Strutt), "On the Crispations of Fluid Resting upon a Vibrating Support," Phil. Mag., vol. 16, 1883, pp. 50-58.

Lord Rayleigh, (J.W. Strutt), "On the Maintenance of Vibrations by Forces of Double Frequency, and on the Propagation of Waves Through a Medium Endowed with a Periodic Structure," Phil. Mag., vol. 24, #147, Aug. 1887, pp. 145-159.

Lord Rayleigh, (J.W. Strutt), Theory of Sound, Macmillan, 2nd edition, 1894, vol. 1, pp. 76-85.

Louisell, W.H., Coupled Mode and Parametric Electronics, Wiley, 1960, p. 92-147.

Mandelstam, L., N. Papalexi, A. Andronov, S. Chaikin and A. Witt, "Report on Recent Research on Nonlinear Oscillations," Technical Physics of the USSR, Leningrad, vol. 2 No. 2-3, 1935, pp. 81-135. (Translation by Philip V. Pesavento available on the internet at http://nedyn.com/Mandelstam.html).

Mandelstam, L.I. and and N. Papalexi, "Oscillations in an Electrical System Energized by Means of Periodically Varying Capacitances," Zhurnal Teknicheskoy Fiziki, vol. 3, No. 7, 1933, pp. 1-6. (Translation by Peter J. Pesavento, available on the internet at: http://nedyn.com/translations.html].

Mandelstam, L.I. and N. Papalexi, "On the Parametric Excitation of Electric Oscillations," Zhurnal Teknicheskoy Fiziki, vol. 4, No. 1, 1934, pp. 1-47. [Translation UCRL-Trans-10231, Univ. of Calif., Lawrence Radiation Laboratory, Livermore, CA, Feb. 1968. available at: http://nedyn.com/translations.html].

Manley, J.M. and E. Peterson, "Negative Resistance Effects in Saturable Reactor Circuits," AIEE Transactions, vol. 65, Dec. 1946, pp. 870-881.

Manley, J.M. and H.E. Rowe, "Some General Properties of Nonlinear Elements—Part I. General Energy Relations," Proceedings of the IRE, vol. 44, 1956, pp. 904-913.

Manley, J.M., "Some General Properties of Magnetic Amplifiers," Proceedings of the IRE, vol. 39, Mar. 1951, pp. 242-251.

Manley, J.M., "Some Properties of Time Varying Networks," IRE International Convention Record, vol. 8, Pt. 2, 1961, pp. 69-78.

Matthaei, G.L., L. Young, and E.M.T. Jones, Microwave Filters, Impedance Matching Networks, and Coupling Structures, McGraw-Hill, 1964, Chapter 14. See pp. 843-887.

McWhorter, M., "Broadband RF Transformer Directional Couplers," RF Design, pp. 53-58, Jul. 1991.

Meers, B. J., "Recycling in laser-interferometric gravitational-wave detectors," The American Physical Society, vol. 38, No. 8, pp. 2317-2326, Oct. 1988.

Melde, F., "Über die Erregung Stehender Wellen eines fadenförmigen Körpers," Ann. Physik Chemie, vol. 109, 1860, p. 193-254, and vol. 111, 1860, p. 513-537.

Miller, S.J., "The Traveling Wave Resonator and High Power Microwave Testing," Microwave Journal, Sep. 1960, pp. 50-58.

Milosevic, L. J., et al., "Traveling-Wave Resonators," IRE Transactions on Microwave Theory and Techniques, pp. 136-143, Apr. 1958.

Minorsky, N., "On Parametric Excitation," Journal of the Franklin Institute, vol. 240, 1945, pp. 25-46.

Minorsky, N., Nonlinear Oscillations, Van Nostrand, 1962, pp. 464-469, 488-509.

Minorsky, N., "Parametric Excitation," Journal of Applied Physics, vol. 22, No. 1, California, Jan. 1951, pp. 49-54.

Mumford, W.W., "Some Notes on the History of Parametric Transducers," Proceedings of the IRE, vol. 48, Issue 5, May 1960, pp. 848-853.

Nergaard, L.S., "Nonlinear Capacitance Amplifiers," RCA Review, vol. 20, 1959, pp. 3-17.

Oliver, B. M., "Directional Electromagnetic Couplers," Proceedings of the I-R-E, pp. 1686-1692, Nov. 1954.

Page, C.H., "Frequency Conversion with Nonlinear Reactance," Journal of Research of the National Bureau of Standads, vol. 58, May 1957, pp. 227-236.

Peterson, E., "Atomic Physics and Circuit Theory," Bell Laboratories Record, vol. 7, No. 2, Feb. 1929, pp. 231-233.

Raab, F. J., "Recycling for a cleaner signal," Nature, vol. 351, pp. 98-100, May 1991.

Raskin, J.P., A.R. Brown, B.T. Khuri-Yakub, and G.M. Rebeiz, "A Novel Parametric-Effect MEMS Amplifier," IEEE Jour. of Microelectromechanical Systems, vol. 9, Dec. 2000, pp. 528-537.

Roe, G.M., and M.R. Boyd, "Parametric Energy Conversion in Distributed Systems," Proc. IRE, vol. 47, 1959, pp. 1213-1218.

Rowe, H.E., "Some General Properties of Nonlinear Elements—Part II. Small Signal Theory," Proceedings of the IRE, vol. 46, 1958, pp. 850-860.

Schwarzkopf, D.B., "The Traveling Wave Resonator as a Short Pulse Generator," Microwave Journal, Oct. 1962, pp. 172-180.

Sferrazza, P.J., "A Traveling Wave Resonator," Proceedings of the National Electronics Conference, vol. 2, 1955, pp. 968-973.

Somlo, P.I., "Some Aspects of the Measurement of the Q Factor of Transmission Lines," IEEE Transactions on Microwave Theory and Techniques, pp. 472-478, Nov. 1963.

Strain, K. A., et al., "Experimental Demonstration of Dual Recycling for Interferometric Gravitational-Wave Detectors," Physical Review Letters, The American Physical Society, vol. 66, No. 11, pp. 1391-1394, Mar. 1991.

Suhl, H., "A Proposal for a Ferromagnetic Amplifier in the Microwave Range," Physical Review, vol. 106, Apr. 15, 1957, pp. 384-385.

Suhl, H., "Theory of the Ferromagnetic Amplifier," Journal of Applied Physics, vol. 28, Nov. 1957, pp. 1225-1236.

Tez, E.S., and Smith, I.R., "The Parametric Transformer: A Power Conversion Device Demonstrating the Principles of Parametric Excitation," IEEE Transactions on Education, vol. E-27, No. 2, May 1984, Loughborough, England, pp. 56-65.

Tien, P.K., "Parametric Amplification and Frequency Mixing in Propagating Circuits," Journal of Applied Physics, vol. 29, 1958, pp. 1347-1357.

Tien, P.K., and H. Suhl, "A Traveling Wave Ferromagnetic Amplifier," Proc. IRE, vol. 46, 1958, pp. 700-706.

Tischer, F.J., "Resonance Properties of Ring Circuits," IEEE Transactions on Microwave Theory and Techniques, vol. MTT-5, 1957, pp. 51-56.

Tomiyasu, K., "Attenuation in a Resonant Ring Circuit," IEEE Transactions on Microwave Theory and Techniques, vol. MTT-8, 1960, pp. 253-254.

Tomiyasu, K., "Effect of a Mismatching Ring in a Traveling-Wave Resonant Circuit," G. E. Microwave Lab, p. 267, Sep. 1957.

Valdes, L.B., Circuit Conditions for Parametric Amplification, General Electric Microwave Laboratory, Palo Alto, California, May 1958, pp. 129-141.

Van der Zeil, A., "On the mixing Properties of Nonlinear Condensers," Journal of Applied Physics, vol. 19, 1948, pp. 999-1006.

Vinet J. Y., et al., "Optimization of Long-Baseline Optical Interferometers for Gravitational-wave Detection," The American Physical Society, vol. 38, No. 2, pp. 433-447, Jul. 1988.

Weiss, M.T., "A Solid State Microwave Amplifier and Oscillator Using Ferrites," Physical Review, vol. 107, Jul. 1957, p. 317.

Weiss, M.T., "Quantum Derrivation of Energy Relations Analogous to those for Nonlinear Reactances," Proceedings of the IRE, vol. 45, Jul. 1957, pp. 1012-1025.

Winter-Gunther, H., "Self-Excitation of Systems with Periodically Varying Inductances," Jahrbuch der drahtlosen Telegraphie und Telephonie, vol. 37, No. 2, 1931, pp. 172-174 (pp. 1-6 as translated).

Winter-Gunther, H., "On Self-Excitated Oscillations in Circuits with Iron-Core Coils," Jahrbuch der drahtlosen Telegraphie und Telephonie, vol. 34, No. 2, 1929, pp. 41-49 (pp. 1-18 as translated).

Young, L., "A Hybrid-Ring Method of Simulating Higher Powers than are Available in WaveGuides," Radio Section, Paper No. 1643, 1954.

International Search Report and Written Opinion for International Application No. PCT/US06/04324 mailed on Jun. 22, 2007.

International Search Report and Written Opinion for International Application No. PCT/US06/04522 mailed on Jun. 31, 2007.

International Search Report and Written Opinion for International Application No. PCT/US08/52387 mailed on Jul. 14, 2008.

International Search Report and Written Opinion for International Application No. PCT/US08/59414 mailed on Aug. 15, 2008.

Supplementary European Search Report, dated Mar. 2, 2012.

* cited by examiner

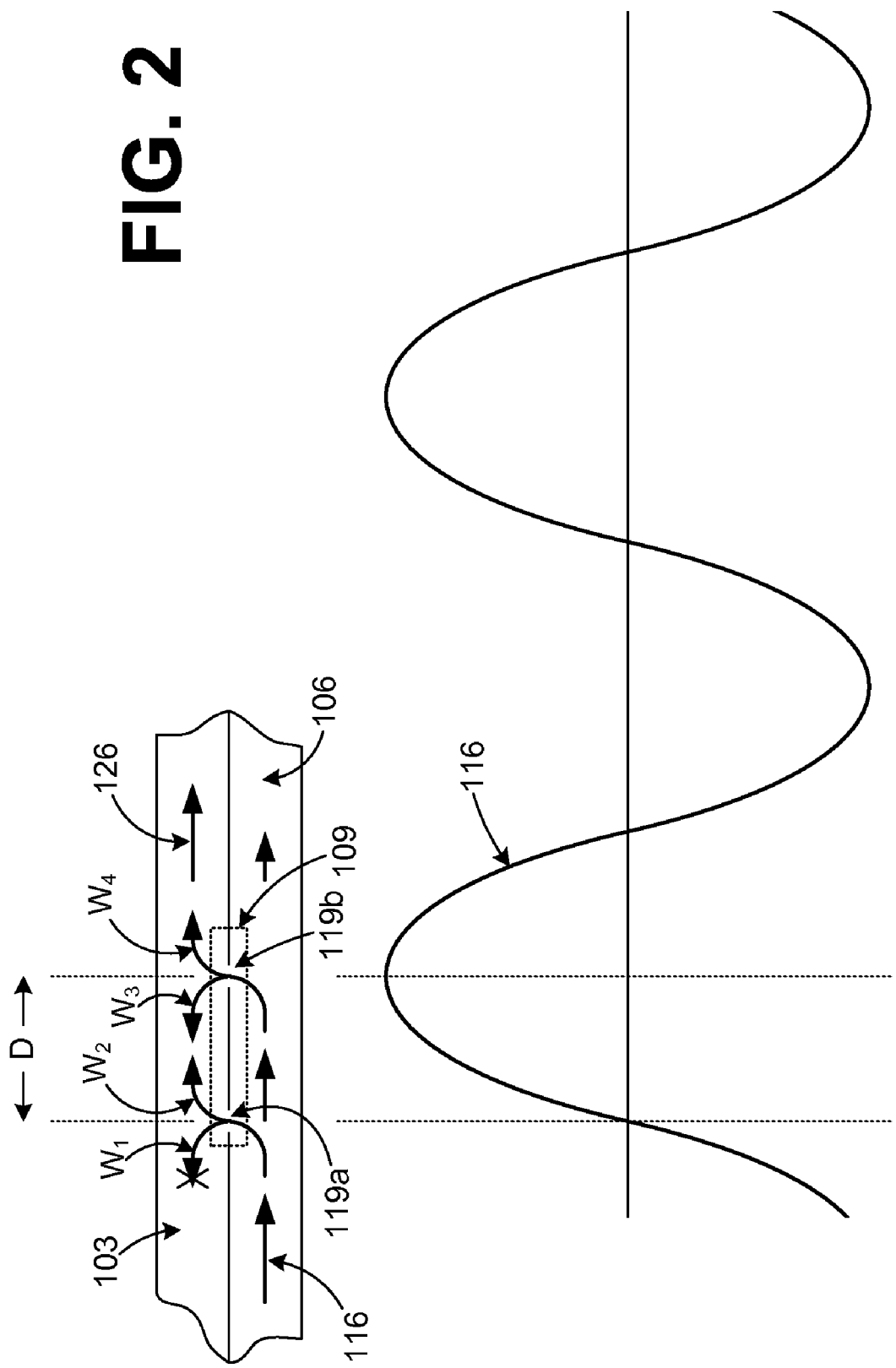

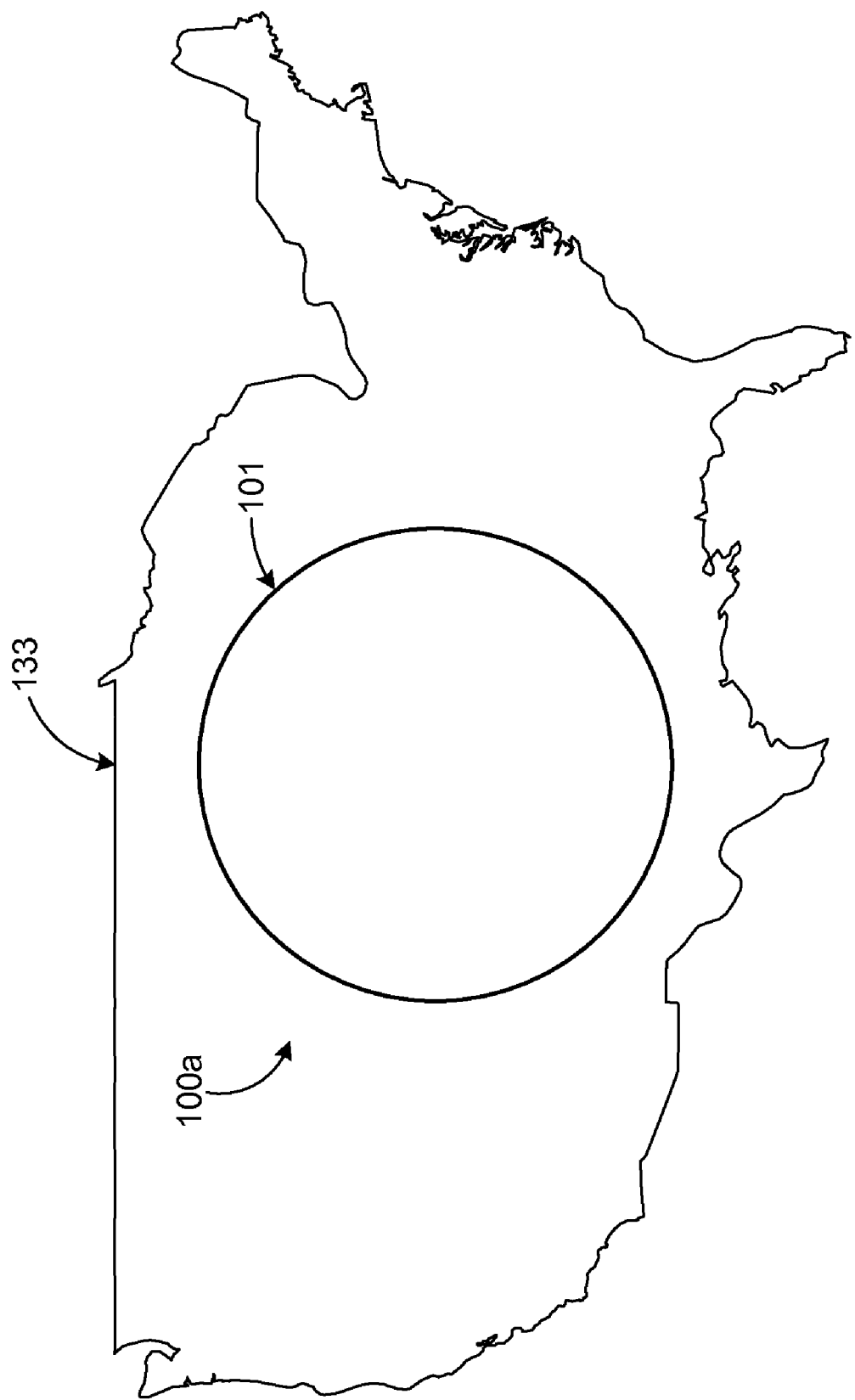

US 8,310,093 B1

MULTIPLY-CONNECTED POWER PROCESSING

CROSS REFERENCE TO RELATED APPLICATION

This application claims priority to co-pending U.S. Provisional Patent Application entitled "MULTIPLY-CONNECTED POWER PROCESSING" filed under Ser. No. 61/051,388 on May 8, 2008, which is incorporated herein by reference in its entirety.

BACKGROUND

Power distributions systems such as the North American power grid can be subject to many anomalies that degrade the quality of the power generated. For example, such anomalies may include transients, harmonics, black outs, brown outs, voltage surges, voltage sags, and other anomalies may occur that can adversely effect sensitive electrical loads. For example, many merchants that sell products on the Internet make use of large server banks that not only need clean power, but need to be protected from outages that might adversely affect the ongoing sales transactions.

BRIEF DESCRIPTION OF THE DRAWINGS

Many embodiments of the invention can be better understood with reference to the following drawings. The components in the drawings are not necessarily to scale, emphasis instead being placed upon clearly illustrating the principles of the various embodiments of the present invention. Moreover, in the drawings, like reference numerals designate corresponding parts throughout the several views.

FIG. 2 is a drawing of a directional coupler of the power multiplier of FIG. 1;

FIG. 3 is a drawing of an impractical power multiplier with respect to a geographical map illustrating a problem of practicing power multiplication using a power multiplier illustrated in FIG. 1 at power frequencies of relatively small wavelengths;

DETAILED DESCRIPTION

Figure 1:
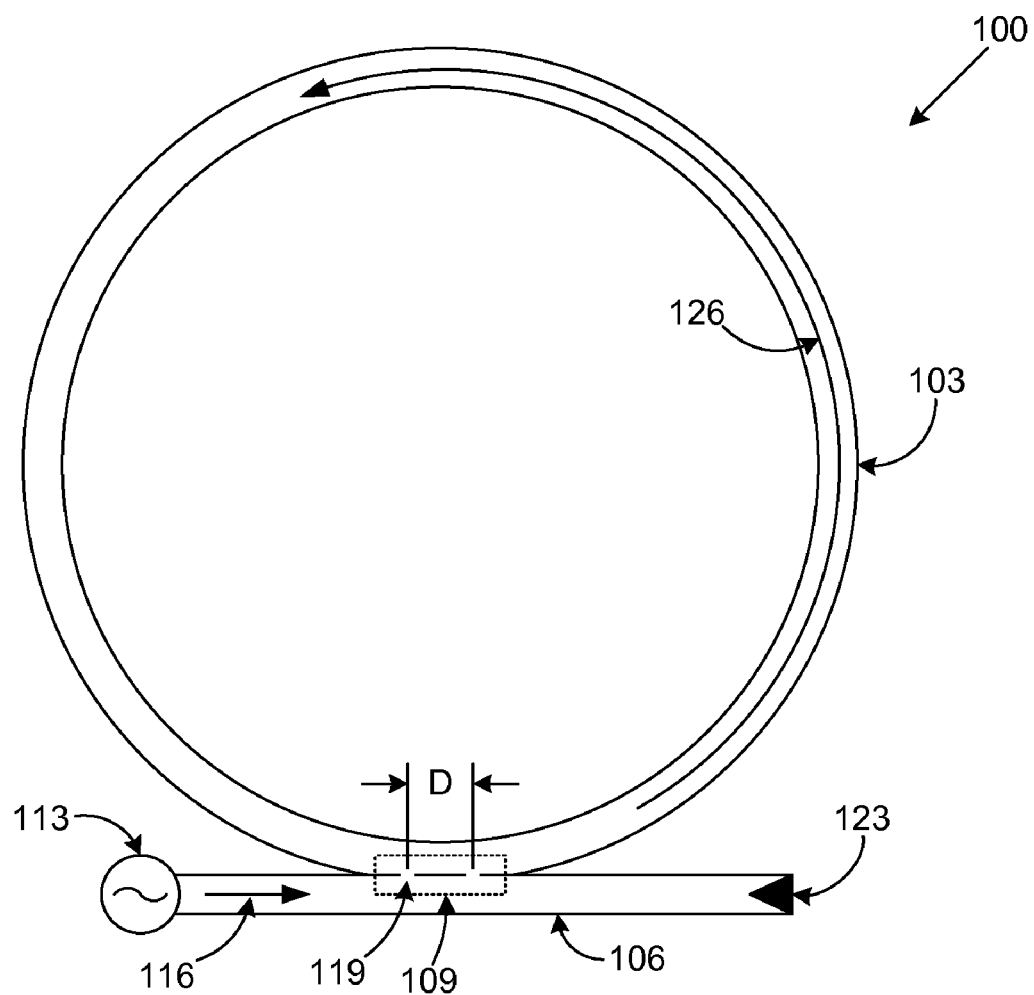
FIG. 1 is a drawing of a power multiplier according to the prior art.

With reference to FIG. 1, shown is a power multiplier 100 according to the prior art. The power multiplier 100 includes a power multiplying waveguide 103 and a launching waveguide 106. Both the power multiplying waveguide 103 and the launching waveguide 106 are conventional transmission lines such as hollow pipes, coaxial cables, parallel wire transmission lines. The launching waveguide 106 is coupled to the power multiplying waveguide 103 using a directional coupler 109. An electromagnetic signal generator 113 is coupled to the launching waveguide 106 and generates an exciting traveling wave 116 that is launched into the launching waveguide 106. The directional coupler 109 includes two slits 119 that are spaced apart by distance D. The distance D is approximately equal to ¼ of wavelength of the exciting traveling wave 116. Thus, the electromagnetic signal generator 113 generates the exciting traveling wave 116 at a predefined frequency having a wavelength $\lambda_w$ that is approximately four times the electrical distance $D/\lambda_w$. The launching waveguide 106 terminates in a matched load 123. The total length of the power multiplying waveguide 103 is an integer multiple of the wavelength $\lambda_w$ of the exciting traveling wave 116. In the case that the power multiplying waveguide 103 is a closed circle or closed ring as shown, the total length of the power multiplying waveguide is equal to its circumference.

To operate the power multiplier 100, the electromagnetic signal generator 113 generates the exciting traveling wave 116 that is launched in the launching waveguide 106. When the exciting traveling wave 116 reaches the directional coupler 109, a portion of the exciting traveling wave 116 is coupled into the power multiplying waveguide 103, thereby creating a traveling wave 126 that propagates along the power multiplying waveguide 103. The directional coupler 109 couples the portion of the exciting traveling wave 116 into the power multiplying waveguide 103 in such a manner that the traveling wave 126 travels in a single direction around the power multiplying waveguide 103. Specifically, since the distance D between the slits 119 is approximately equal to ¼ of the wavelength $\lambda_w$ of the exciting traveling wave 116, all energy coupled into the power multiplying waveguide 103 propagates in a single direction as will be further described with reference to later figures.

In addition, since the length of the power multiplying waveguide 103 is an integer multiple of the wavelength $\lambda_w$ of the exciting traveling wave 116, the traveling wave 126 is spatially synchronized with the exciting traveling wave 116. Under these conditions, the portion of the exciting traveling wave 116 that is continually coupled into the power multiplying waveguide 103 reinforces or is added to the traveling wave 126. Consequently, the power of the traveling wave 126 may become quite large in magnitude. That is to say, the Poynting's vector power flow, ½ Re{E×H*} is pumped up within the power multiplying waveguide, which is a linear, passive, distributed energy storage structure. The average energy of the traveling wave 126 is "distributed" in that it is evenly distributed throughout the entire length of the power multiplying waveguide 103.

Once begun, the buildup of the power of the traveling wave 126 within the power multiplying waveguide 103 will continue until the losses around the power multiplying waveguide 103 plus the loss in the matched load 123 that terminates the launching waveguide 106 is equal to the power generated by the electromagnetic signal generator 113. The power magnification M and optimum coupling $C_{Opt}$ may be calculated as follows:

$$M = \frac{1}{(1-A^2)}, \text{ and}$$

$$C_{Opt} = 1-A^2,$$

where A is the field propagation decay for a single traversal of the power multiplying waveguide 103. The quantity of $C_{Opt}$ is that value of coupling for which the magnification is maximized.

The directional coupler has the property that energy leaking from the power multiplying waveguide 103 back into the launching waveguide 106 is reduced in magnitude. Also, energy leaking back into the launching waveguide 106 propagates only in a single direction towards the matched load 123 and, since such energy is of the correct phase, it cancels out the power propagating from the electromagnetic signal generator 113 to the matched load 123. Consequently, when the exciting traveling wave 116 and the traveling wave 126 are in phase, the matched load 123 dissipates little or no power. Convenient nomograms for the engineering design of lossy power multipliers operating at ultra-high frequencies are described in Tomiyasu, K., "Attenuation in a Resonant Ring Circuit," *IEEE Transactions on Microwave Theory and Techniques*, Vol. MTT-8, 1960, pp. 253-254.

Referring next to FIG. 2, shown is a drawing of a portion of the power multiplying waveguide 103 and a portion of the launching waveguide 106. Also shown is the directional coupler 109. The drawing of FIG. 2 is provided to further explain the function of the directional coupler 109. To explain the operation of the directional coupler 109, the exciting traveling wave 116 is launched into the launching waveguide 106 and approaches the first slit 119a. A portion of the exciting traveling wave 116 enters the power multiplying waveguide 103 through the first slit 119a propagates in both directions within the power multiplying waveguide 103 as wave portion $W_1$ and wave portion $W_2$. The portion of the exciting traveling wave 116 that does not pass through the first slit 119a proceeds along the launching waveguide 106 until it reaches the second slit 119b. At this point, a second portion of the exciting traveling wave 116 enters the power multiplying waveguide 103 through the second slit 109b and propagates in both directions in the power multiplying waveguide 103 as wave portion $W_3$ and wave portion $W_4$. If the distance D between the slits is equal to ¼ of the wavelength $\lambda_w$ of the exciting traveling wave 116 as shown, then the wave portion $W_3$ cancels out the wave portion $W_1$. Also, the wave portion $W_2$ reinforces the wave portion $W_4$, thereby resulting in the traveling wave 126. As a consequence of the cancellation of wave portions $W_1$ and $W_3$, and the reinforcement of wave portions $W_2$ and $W_4$, the traveling wave 126 proceeds in a single direction around the power multiplying waveguide 103. Given that the exciting traveling wave 116 and the traveling wave 126 are in phase or are spatially synchronized, the portion of the exciting traveling wave 116 that is coupled into the power multiplying waveguide 103 is continually added to the traveling wave 126, thereby multiplying the power of the traveling wave 126. The power of the traveling wave 126 is real power. This is to say that there is no reactive component.

Referring next to FIG. 3, shown is a drawing of a map of the United States 133 that illustrates the problem that prevents the operation of power multipliers 100 at low frequencies such as power frequencies. Assume, for example, that the frequency of operation is 60 Hertz which represents the frequency of the power generation system of the United States. Assuming that the speed of light is approximately 300,000 km/sec, at 60 Hertz, the wavelength of both the exciting traveling wave 116 and the traveling wave 126 is calculated as:

$$\lambda_w = \frac{c}{f} \approx \frac{300,000 \text{ km/sec}}{60 \text{ Hz}} \approx 5000 \text{ km}.$$

Thus, the length or circumference of a hypothetical power multiplying waveguide 100a would have to be approximately 5000 Kilometers. Consequently, a corresponding hypothetical transmission line 101 employed in the power multiplying waveguide 100a would be approximately 5000 Kilometers in length. Obviously, due to the size involved, the creation of such a power multiplying waveguide 100a is not physically practical and is cost prohibitive.

Figure 4A:
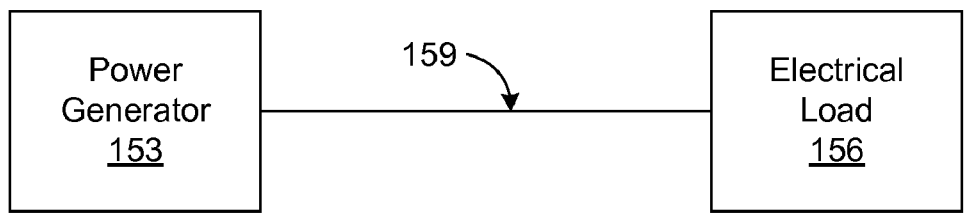
FIG. 4A is a block diagram of power transmission line from a power generator to an electrical load.

Turning then to FIG. 4A, we turn our attention to a discussion of power transmission lines. In FIG. 4A, a power generator 153 is electrically coupled to an electrical load 156 by a power transmission line 159. Such a transmission line 159 may be traditionally employed, for example, to distribute power to homes and businesses as can be appreciated by those with ordinary skill in the art.

Figure 4B:
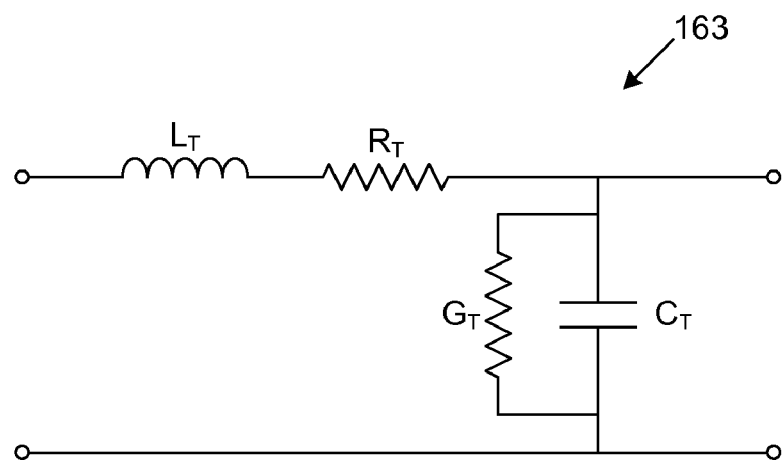
FIG. 4B is a schematic of an equivalent impedance per length of transmission line of FIG. 4A.

Referring next to FIG. 4B, shown is an equivalent circuit 163 that illustrates the equivalent impedance per unit length of the transmission line 159 (FIG. 4A). Specifically, each unit length of the transmission line 159 includes series inductance $L_T$ and series resistance $R_T$. Also, between the conductors of the transmission line 159 are a shunt capacitance $C_T$ and a shunt conductance $G_T$. Accordingly, the equivalent impedance per unit length of the transmission line 159 may be expressed in terms of a series inductance $L_T$, a series resistance $R_T$, a shunt capacitance $C_T$, and a shunt resistance $R_T$.

The equivalent circuit 163 reflects that fact that transmission lines 159 direct the propagation of field energy. The field energy propagating along a transmission line 159 is stored in the magnetic fields and electric fields associated with the structure of the transmission line 159 itself. On a mode-by-mode basis, one can equate the magnetic field energy stored in a transmission line 159 to the magnetic field energy stored in an equivalent distributed inductance. Also, the energy stored in the electric fields of the line can be equated to the energy stored in an equivalent distributed capacitance. Field power losses per unit length of the transmission line 159 can be equated to the equivalent series resistive and shunt conductive losses per unit length.

Figure 5:
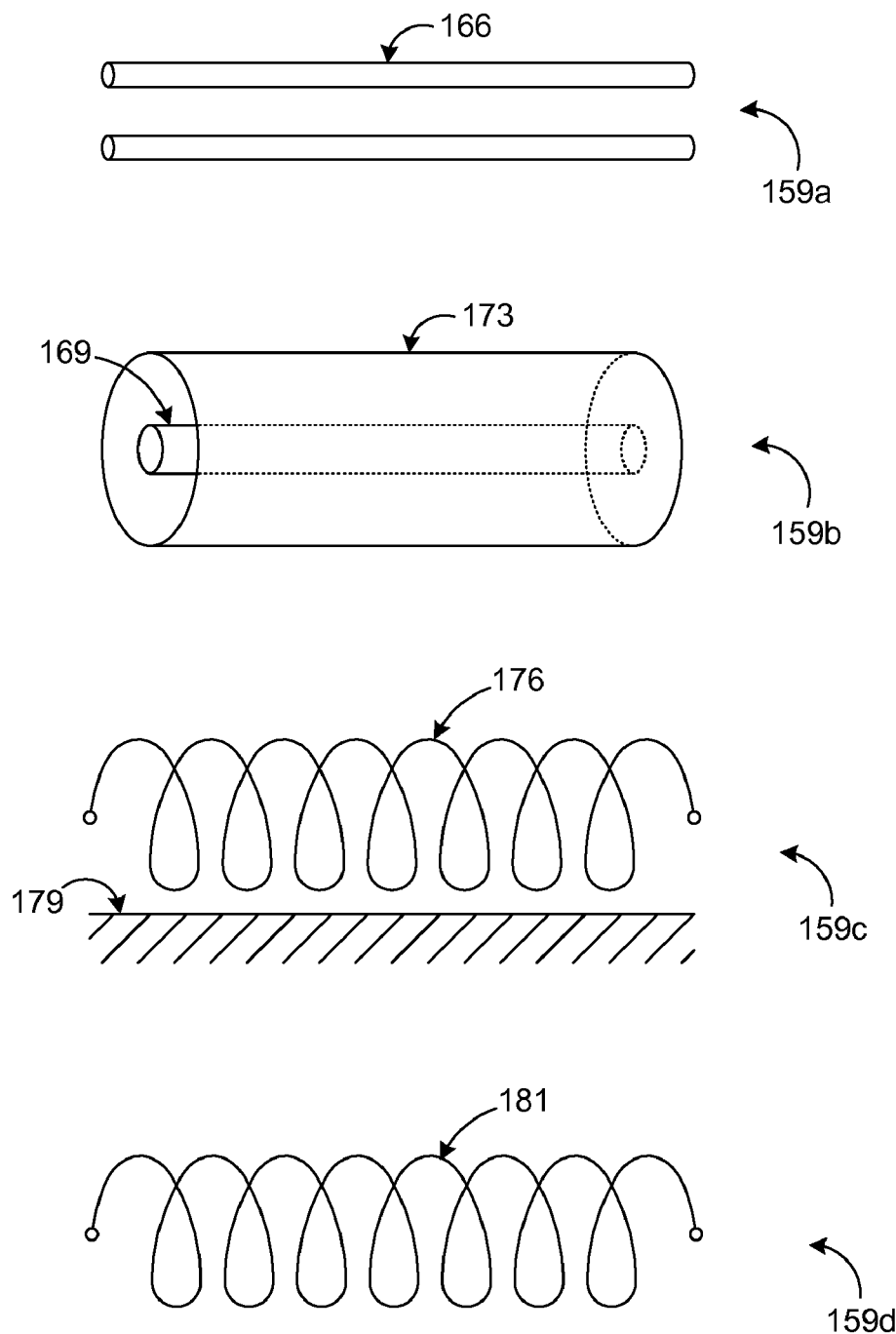
FIG. 5 is a drawing of alternative transmission lines that might be employed as the power transmission line of FIG. 4A and that have an equivalent impedance that can be modeled by the schematic of FIG. 4B.

Turning then to FIG. 5, shown are various embodiments of the transmission line 159 (FIG. 4A) for which the equivalent impedance may be expressed using the equivalent circuit 163 (FIG. 4B) discussed above. For example, transmission line 159 may comprise, for example, a parallel transmission line 159a that includes parallel conductors 166. Alternatively, the transmission line 159 may comprise a coaxial transmission line 159b that includes an inner conductor 169 and an outer conductor 173. In yet another alternative, the transmission line 159 may comprise an electrical structure 159c that includes a conductor 176 of a predefined geometry situated with respect to a ground plane 179. Alternatively, the conductor 176 may be situated with respect to a second such conductor rather than the ground plane 179. The predefined geometry of the conductor 176 may be, for example, a helix or other geometry. In still another alternative, the transmission line 159 may comprise an electrical structure 159d that comprises a single conductor 181 in the form a helix or other appropriate shape. In addition the transmission line 159 may comprise other types of transmission lines and electrical structures such as, for example, strip lines, fiber optic cables, and so on as can be appreciated by those with ordinary skill in the art.

Assuming that were actually possible to create the power multiplier 100a at power frequencies such as 60 Hertz, for example, such a power multiplier 100a would involve the use of transmission wire in one of the configurations described above. In this respect, the impedance of such a transmission wire can be calculated and the equivalent impedance in terms of the series inductance $L_T$ (FIG. 4B), the series resistance $R_T$ (FIG. 4B), the shunt capacitance $C_T$ (FIG. 4B), and the shunt conductance $G_T$ (FIG. 4B) can be determined.

Figure 6A:
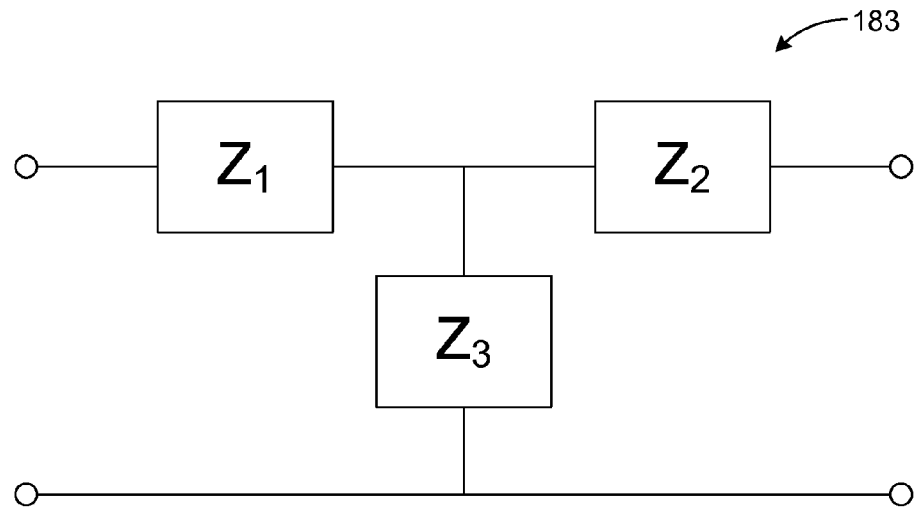
FIG. 6A is a schematic of a T-network employed in a power multiplier according to one embodiment.
Figure 6B:
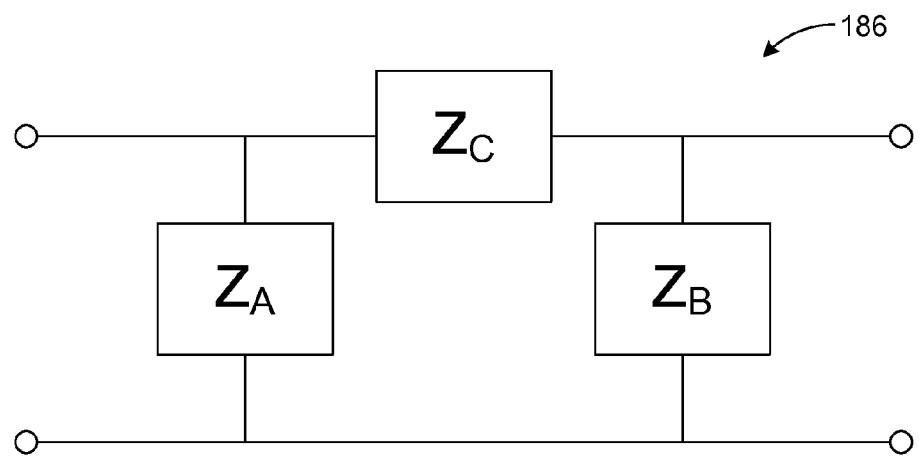
FIG. 6B is a schematic of a π-network employed in a power multiplier according to one embodiment.

With reference to FIGS. 6A and 6B, shown are a T-network 183 and a π-network 186 that may be employed according to the various embodiments of the present invention. In this respect, the T-Network 183 includes series impedance $Z_1$ and series impedance $Z_2$. The T-Network 183 also includes parallel impedance $Z_3$. The characteristic impedance $Z_0$ of a symmetrical T-network 183 shown may be calculated as follows:

$$Z_0 = \sqrt{Z_1(Z_1 + 2Z_3)}.$$

The π-network 186 includes parallel impedances $Z_A$ and $Z_B$. The π-network 186 also includes series or middle impedance $Z_C$. The characteristic impedance $Z_0$ of a symmetrical π-network 186 may be calculated as follows:

$$Z_0 = Z_A \sqrt{\frac{Z_C}{(Z_C + 2Z_A)}}.$$

For further discussion of both the T-network 183 and/or the π-network 186, reference is made to Terman, F. E., *Radio Engineering Handbook*, McGraw-Hill, 1943, pp. 172-178, 191-215, which is incorporated herein by reference in its entirety. The T-network 183 and/or the π-network 186 may be employed, for example, in the construction of a power multiplier according to various embodiments of the present invention as will be discussed. In particular, the impedance represented by the T-network 183 and/or the π-network 186 are forms of the equivalent circuit 163 (FIG. 4B).

Figure 7A:
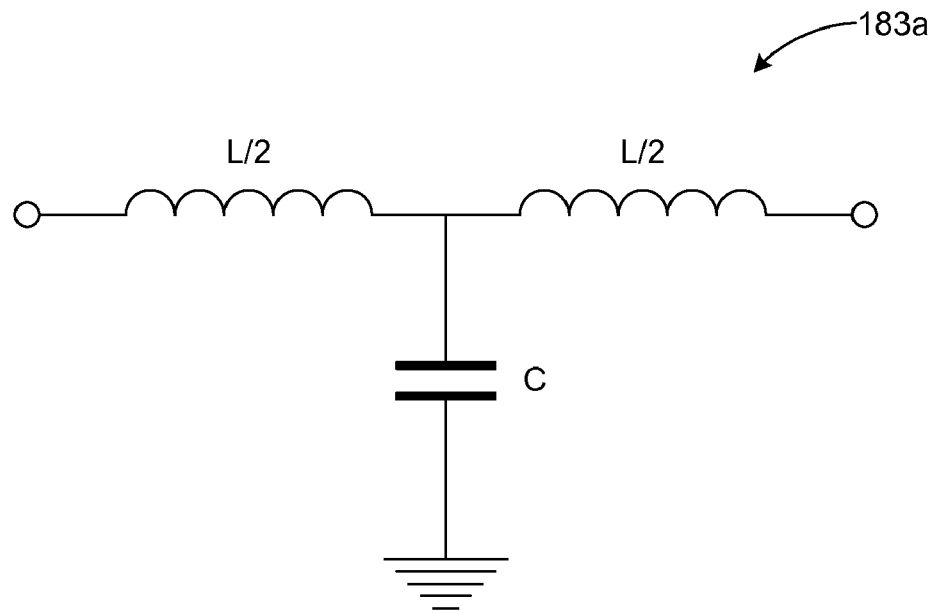
FIG. 7A is a schematic of an embodiment of the T-network of FIG. 6A.
Figure 7B:
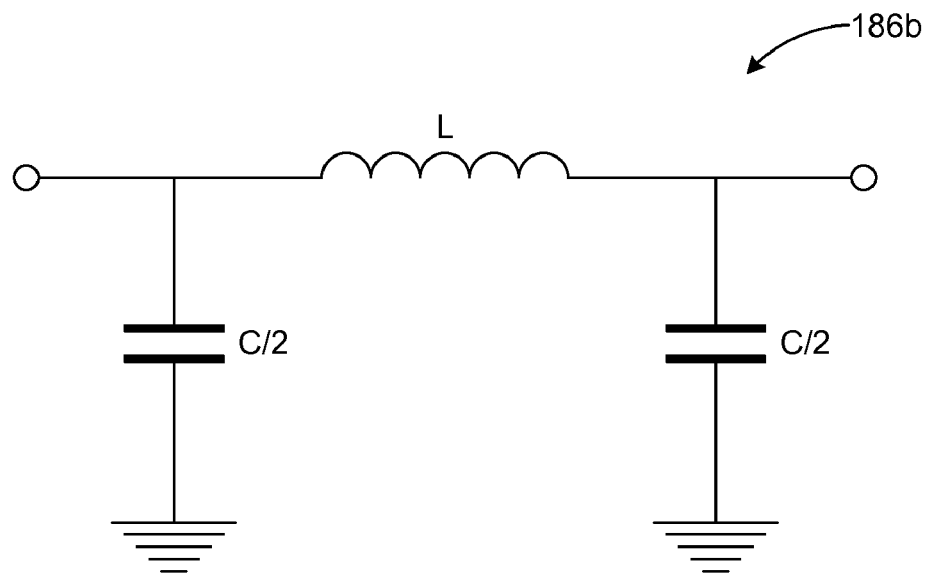
FIG. 7B is a schematic of an embodiment of the π-network of FIG. 6B.

Referring next to FIGS. 7A and 7B, shown are an example schematic of both a T-network 183a and a π-network 186a that may be employed in various embodiments of the present invention. In this respect, the T-network 183a includes series inductance L that is shown as two separate series inductances L/2. In addition, the T-network 183a also includes a shunt capacitance C. The T-network 183a includes a series loss resistances R and a shunt conductance G that are inherent in the conductors making up the inductances L/2, the capacitance C, and the electrical wire connecting such components.

The π-network 186a includes a series inductance L and shunt capacitances C/2. For multiple π-networks 186a that are coupled together in series, adjacent shunt capacitances C/2 may be added together to become capacitance C. The π-networks 186a also includes a series resistance R and a shunt conductance G that are inherent in the conductors making up the inductance L, the capacitances C/2, and the electrical wire connecting such components. The T-network 183a and π-network 186a illustrate more particular embodiments of the T-networks 183 or π-networks 186.

Figure 8:
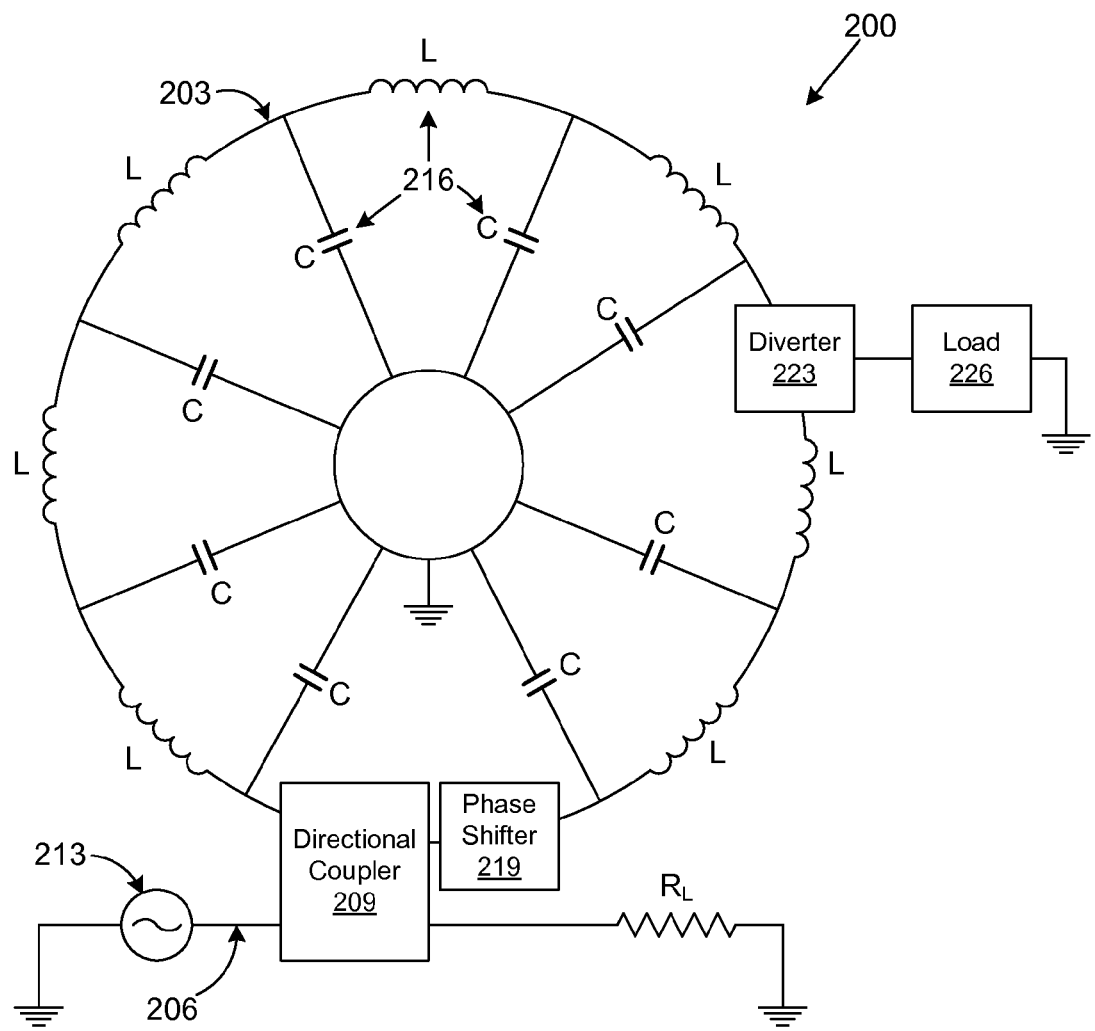
FIG. 8 is a schematic of a power multiplying network according to one embodiment.

Turning then, to FIG. 8, shown is an example of a power multiplier 200 according to an embodiment of the present invention. The power multiplier 200 includes a power multiplying network 203 and a launching network 206. The launching network 206 also includes a directional coupler 209 that couples the launching network 206 to the power multiplying network 203. A power source 213 is coupled to the launching network 206. Also, the launching network 206 is terminated in a matching load $R_L$.

In one embodiment, the power multiplying network 203 is a multiply-connected, velocity inhibiting circuit constructed from a number of lumped-elements 216. As contemplated herein, the term "network" is defined as an interconnected structure of electrical elements. The terms "multiply-connected" is a mathematical term describing the existence of a closed path in a resonator, waveguide, or other electrical structure that cannot be reduced to a point without part of the closed path passing through regions that are external to the geometrical boundaries of the resonator, waveguide, or other electrical pathway. The power multiplying network 203 is "velocity inhibiting" as the electrical structure of the power multiplying network 203 results in a reduced velocity of propagation of an electromagnetic wave through the power multiplying network 203 relative to the speed of an electromagnetic wave through free space, which is the speed of light.

In addition, the term "lumped" is defined herein as effectively concentrated at a single location. Thus, the terms "lumped-elements" refer to discrete, two-terminal, concentrated electrical elements such as capacitance, inductances, resistance, and/or conductance. Thus, the lumped-elements as described herein may comprise discrete inductors, capacitors, or resistors. In addition, as contemplated herein, lumped-elements may also comprise diodes, transistors, and other semi-conductors that may be described, for example, as nonlinear resistors or conductors that have resistance or conductance that is controlled by the polarity of applied voltages or currents, etc. In addition, lumped-elements may also comprise inherent capacitances, inductances, resistances, or conductances of various electrical structures such as helices, parallel plates, or other structure as will be discussed. Similar to the power multiplying network 203, the directional coupler 209 is also constructed using lumped-elements.

The power multiplying network 203 is a velocity inhibiting circuit that results in a slower velocity of propagation of an electrical disturbance such as a traveling wave. In this respect, the power multiplying network 203 has an electrical length that is equal to an integer multiple of the wavelength of the operating frequency of the power source 213. Due to the velocity inhibited nature of the power multiplying network 203, its size is quite compact in comparison with the wavelength of the operating frequency of the power source 213. In addition, the directional coupler 209 causes a phase shift that is equal to one quarter of the wavelength of an exciting traveling wave generated by the power source 213 at the operating frequency as will be discussed.

In one embodiment, the power multiplying network 203 is constructed from lumped-elements 216 such as, for example, the inductances L and capacitances C as shown in FIG. 8. In one embodiment, the inductances L may be actual inductors and the capacitances C may be actual capacitors that are either commercially available or may be constructed as needed. For example, the power multiplying network 203 may be characterized as a ring of interconnected T-networks 183a (FIG. 7A) or π-networks 186a (FIG. 7B), although the interconnected T-networks 183a (FIG. 7A) or π-networks 186a (FIG. 7B) may be arranged in a multiply-connected structure other than a ring. Each of the T-networks 183a or π-networks 186a may be considered a "section" of the power multiplying network 203. In this respect, assuming that the power multiplying network 203 comprises a number of T-networks 183a, then each inductance L may be divided into two series inductances L/2 that make up the series inductances L/2 as described in the T-network 183a (FIG. 7A). Similarly, assuming that the power multiplying network 203 comprises a number of π-networks 186a, each capacitance C may be also be viewed as a pair of shunt capacitances C/2, each such shunt capacitance C/2 making up one of the shunt capacitances C/2 of the π-network 186a (FIG. 7B). Whether T-networks 183a or π-networks 186a are employed to create the sections of the power multiplying network 203, each of the networks 183a or 186a results in a predefined phase shift $\phi_s$.

Assuming that either T-networks 183a or π-networks 186a are to be employed to construct the power multiplying network 203 at some frequency f and some quality factor Q, then values for the lumped elements 216 such as the inductances L and capacitances C or other lumped elements are determined. The quality factor Q is defined conventionally as $$Q = \frac{f}{\Delta f}.$$

Such values may be calculated from the known characteristic impedance $Z_o$ and the transmission line complex propagation constant $\gamma$ of a predetermined portion of the hypothetical transmission line 101 (FIG. 3) of the hypothetical power multiplier 100a. In this respect, the characteristic impedance $Z_o$ and the transmission line complex propagation constant $\gamma$ may be calculated for a predefined unit length of the hypothetical transmission line 101 as follows:

$$Z = R_T + j\omega L_T,$$

$$Y = G_T + j\omega C_T,$$

$$Z_o = \sqrt{Z/Y} = \sqrt{(R_T + j\omega L_T)/(G_T + j\omega C_T)}, \text{ and}$$

$$\gamma = \sqrt{ZY} = \sqrt{(R_T + j\omega L_T)(G_T + j\omega C_T)},$$

where Z is the series impedance per unit length of transmission line, Y is the shunt admittance per unit length of transmission line. In the low loss case (i.e. $R_T \approx 0$ and $G_T \approx 0$), the characteristic impedance reduces to $$Z_o = \sqrt{L_T/C_T}.$$

In addition, the velocity of propagation may be calculated as $$v = \frac{1}{\sqrt{L_T C_T}}.$$

In order to determine values for $R_T$, $L_T$, $G_T$, and $C_T$, for a given section of transmission line 159, various references may be consulted that provide such information such as, for example, Terman, F. E., *Radio Engineering Handbook*, McGraw-Hill, 1943, pp. 172-178, 191-215, or other references as can be appreciated.

Once the characteristic impedance $Z_o$ for a predefined portion of the hypothetical transmission line 101 is known, then the complex electrical length θ of the predefined portion of the hypothetical transmission line 101 is calculated as $$\theta = \gamma l$$

where l is the physical length of the predefined portion of the hypothetical transmission line 101. Given the characteristic impedance $Z_o$, the transmission line complex propagation constant γ, and the electrical length θ of the predefined portion of the hypothetical transmission line 101, the series impedances $Z_1$ and $Z_2$, and the shunt impedance $Z_3$ of the T-network 183 (FIG. 6A) may be calculated as follows:

$$Z_1 = Z_2 = Z_o \tan h(\theta/2), \text{ and}$$

$$Z_3 = Z_o/\sin h(\theta).$$

Alternatively, the shunt impedances $Z_A$ and $Z_B$, and the middle impedance $Z_C$ of the π-network 186 may be calculated as follows:

$$Z_A = Z_B = Z_o \cot h(\theta/2), \text{ and}$$

$$Z_C = Z_o \sin h(\theta).$$

Once the series impedances $Z_1$ and $Z_2$, and the shunt impedance $Z_3$ of the T-network 183, or the shunt impedances $Z_A$ and $Z_B$, and the middle impedance $Z_C$ of the π-network 186 are known, then corresponding values for L and C may be determined. Assuming, for example, that one has calculated the shunt impedances $Z_A$ and $Z_B$, and the middle impedance $Z_C$ of the π-network 186, then inductance L associated with the middle impedance $Z_C$ may be calculated therefrom where $$Z_C = r + j\omega L.$$

Also, the capacitance C associated with the shunt impedances $Z_A$ and $Z_B$ may be calculated where $$Z_A = Z_B = \frac{1}{j\omega C}.$$

It may be the case that L and C are too large to be practically represented in the form of a lumped element 216. If such is the case, then a reverse calculation or reverse mapping may be performed using known values for L and C to determine how much of the hypothetical transmission line 101 may be represented by a given T-network 183 or π-network 186. In this respect, one may determine how many T-networks 183 or π-networks 186 may necessarily be employed in a given power multiplying network 203. In this respect, values may be chosen for L and C in view of the calculated values for L and C identified above.

Assuming that the series impedances $Z_1$ and $Z_2$, and the shunt impedance $Z_3$ of the T-network 183 are calculated from predetermined values for L and C, then the characteristic impedance $Z_o$ and the transmission line complex propagation constant γ may be calculated as follows:

$$Z_o = \sqrt{Z_1(Z_1+2Z_3)}, \text{ and}$$

$$\gamma = \text{Arc tanh}\left(\frac{\sqrt{Z_1(Z_1+2Z_3)}}{Z_1+Z_3}\right).$$

Alternatively, assuming that the shunt impedances $Z_A$ and $Z_B$, and the middle impedance $Z_C$ of the π-network 186 are calculated from predetermined values for L and C, then the characteristic impedance $Z_o$ and the transmission line complex propagation constant γ may be calculated as follows:

$$Z_o = Z_A\sqrt{\frac{Z_C}{Z_C+2Z_A}}, \text{ and } \gamma = \text{Arc tanh}\left(\frac{\sqrt{Z_C(Z_C+2Z_A)}}{Z_A+Z_C}\right).$$

Once the length l of the hypothetical transmission line 101 that is represented by a specified T-network 183 or π-network 186 is known, then one can determine how many similar T-networks 183 or π-networks 186 are needed to simulate the impedance of the entire hypothetical transmission line 101. Thus, by performing the forward and reverse calculations described above, one can determine general values for the inductances L and capacitances C of the power multiplying network 203.

In addition, the power multiplying network 203 further comprises a phase shifter 219. The phase shifter 219 comprises a circuit constructed from lumped-elements that is combined in series with a portion of the directional coupler 209 to make up the inductance L of the specific section within which the directional coupler 209 is located.

The power multiplying network 203 also includes a diverter 223 that couples the power multiplying network 203 to a load 226. The diverter 223 is defined herein as an electrical element or circuit that may be employed to divert or redirect all or a portion of a traveling wave from the power multiplying network 203 to the load 226. In this respect, the diverter 223 may comprise, for example, a switch, relay, solid state switch, plasma switch, or other device with like capability. The diverter 223 may also be a circuit that presents an electric window that is biased using a predefined control voltage or current to divert the energy within a traveling wave to the load 226, depending upon the state of the control voltage or current, etc.

During operation, the power source 213 is employed to launch an exciting traveling wave in the launching network 206. The exciting traveling wave may be, for example, a sinusoidal wave or other appropriate shape. The directional coupler 209 couples at least a portion of the exciting traveling wave from the launching network 206 into the power multiplying network 203, thereby resulting in a traveling wave that propagates within the power multiplying network 203. Given that the electrical length of the power multiplying network 203 is an integer multiple of the wavelength of the power source 213 and that the directional coupler 209 is equal to ¼ of the wavelength of the power source 213, then the traveling wave that propagates within the power multiplying network 203 is continually reinforced by the portion of the exciting traveling wave that is coupled into the power multiplying network 203. Also, the traveling wave propagates in a single direction around the power multiplying network 203. This results in power magnification M of the power of the traveling wave by a predefined factor that may be many times greater than the power of the power source 213, depending upon the losses and tolerances of the lumped-elements 216 and other factors.

Both the exciting traveling wave launched into the launching network 206 and the traveling wave that propagates around the power multiplying network 203 may be AC power signals such as electrical power signals generated at 50 Hertz, 60 Hertz, 400 Hertz, or any other power frequency as can be found in the electrical generation systems in the United States and countries around the world. However, in any event, the frequency of the exciting traveling wave, the traveling wave, and the power source 213 may be any frequency possible, although they typically correspond to frequencies with wavelengths for which the closed path length of the power multiplying network 203 is approximately ¹⁄₁₀ the wavelength or less of the traveling wave.

When the exciting traveling wave is applied to the launching network 206, the power of the traveling wave continually increases with time until it reaches a maximum power. The maximum power is reached when the losses in the power multiplying network 203 plus the losses in the matching load $R_L$ are equal to the power supplied by the power source 213. When the maximum power is reached, the diverter 223 may be actuated to direct the traveling wave from the power multiplying network 203 to the electrical load 226. In a typical situation, it may take up to approximately a dozen cycles to reach maximum power in the power multiplying network 203, although it is possible that maximum power may be reached in more or less cycles. Alternatively, the diverter 223 may be actuated to direct the traveling wave from the power multiplying network 203 at any time deemed appropriate such as, for example, when the energy accumulated in the power multiplying network 203 reaches any predefined threshold, etc.

The power multiplier 200 provides significant advantages in that it facilitates real power multiplication at lower power frequencies such as the operating frequencies of electrical power distribution systems around the world that operate, for example, at 50 Hertz, 60 Hertz, 400 Hertz, or other low frequencies. The velocity inhibiting nature of the power multiplying network 203 facilitates the creation of a power multiplier 200 that can operate at such low power generation frequencies with astonishing size reduction. That is to say, where prior theory may have taught that power multipliers operating at conventional power generation frequencies might have required a hypothetical waveguide that extended for thousands of kilometers as discussed with reference to FIG. 3, now the same can be created in a compact size that fits, for example, in a small room.

The velocity of propagation of the traveling wave through the power multiplying network 203 relative to the velocity of a traveling wave through free space is described herein as the velocity factor. The velocity inhibiting nature of the power multiplying network 203 provides for velocity factors that are on the order of 1/1,000,000, although even smaller velocity factors may be achieved.

In addition, the power multiplier 200 may further include a number of launching networks 206, each launching network 206 being coupled to the power multiplying network 203 by a directional coupler 209. Such a configuration would facilitate a corresponding increase in the rate at which the power of the traveling wave accumulates during operation of the power multiplier 200.

In an alternative embodiment, the traveling wave may be a solitary wave that propagates around the power multiplying network 203. In order to propagate a solitary wave around the power multiplying network 203, the power multiplying network 203 is constructed so as to include nonlinear elements such as, for example, diodes, transistors, or other active components so as to be nonlinear and dispersive. Thus, nonlinear components are defined herein as components that provide an output having an amplitude that is not linearly proportional to the input as can be appreciated by those with ordinary skill in the art. By constructing the power multiplying network 203 from a suitable network of nonlinear elements and/or a combination of linear and nonlinear elements, a solitary wave may be propagated around the power multiplying network 203. In this respect, the power source 213 would be a pulse generator that generates and launches an exciting traveling wave into the launching network 206. To achieve power multiplication, a solitary exciting traveling wave would have to be spatially synchronized with the solitary traveling wave. In addition, the launching network 206, the directional coupler 209, and the phase shifter 219 may be constructed to include elements that are nonlinear and dispersive in nature to facilitate the propagation of solitary waves there through.

It should be appreciated that as the gain of the power multiplying network 203 increases, its quality factor Q rises and its bandwidth BW narrows around the operating frequency. In one embodiment, this may be a desirable asset for a strictly monochromatic system. Should broader bandwidths BW be desired, the electrical bandwidth BW of the power multiplying network 203 may be tailored for the specific application. For example, low-loss power multiplying networks 203 with broader and controlled-shape passbands may be constructed following various electrical filter design. See for example, Matthaei, G. L., L. Young, and E. M. T. Jones, *Microwave Filters, Impedance Matching Networks, and Coupling Structures*, McGraw-Hill, 1964; and Fano, R. M., *Theoretical Limitations on Broadband Matching of Arbitrary Impedances*, Journal of the Franklin Institute, Vol. 249, 1950, pp. 53-83 and 129-155.

In another embodiment, the power multiplier 200 as described above may also be constructed incorporating so called "Tracking-Filter" design techniques such that the electrical passband of the power multiplier 200 can be dynamic and automatically controlled to coherently track frequency and phase variations of the power source 213 while maintaining the desired operational properties described above. In implementing a power multiplier 200 with a dynamic electrical passband, the frequency of the power source 213 is monitored and compared with the resonant frequency of the power multiplying network 203. An error signal may be generated from such a comparison and employed in a feedback loop to dynamically modify the ring component parameters such as the lumped-elements of the power multiplying network 203 to tune it to the spectral variations of the power source 213. In such case, the lumped-elements described above may be parametrically dynamic with variable parameters as can be appreciated.

Figure 9:
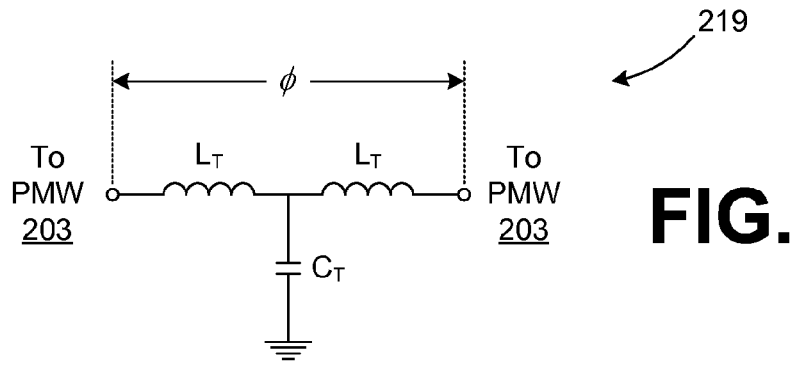
FIG. 9 is a schematic of a phase shifter employed in the power multiplier of FIG. 8 according to one embodiment.

Referring next to FIG. 9, shown is a schematic that provides one example of the phase shifter 219 according to an aspect of the present invention. The phase shifter 219 comprises a T-network 183a (FIG. 7A), although a π-network 186a may be employed as well. In this respect, the phase shifter 219 includes series inductances $L_T$ and a shunt capacitance $C_T$. In this respect, the phase shifter 219 is constructed from lumped-elements as part of the power multiplying network 203.

The series inductances $L_T$ and the shunt capacitance $C_T$ are specified so as to result in a phase shift $\phi_S$. The series inductances $L_T$ and/or the shunt capacitance $C_T$ (assuming that a T-network 183a is employed) may be variable so as to allow the phase shift $\phi_S$ to be adjusted as necessary to compensate for any inaccuracies in the phase shifts $\phi_S$ of each section and in the phase shift $\theta$ of the directional coupler 209. This is done to ensure that the total phase shift presented by the power multiplying network 203 is an integer multiple of 360 degrees for the wavelength of the power source 213. The specific calculations that are performed to determine the values of the inductances $L_T$ and the shunt capacitance $C_T$ will be discussed.

Figure 10:
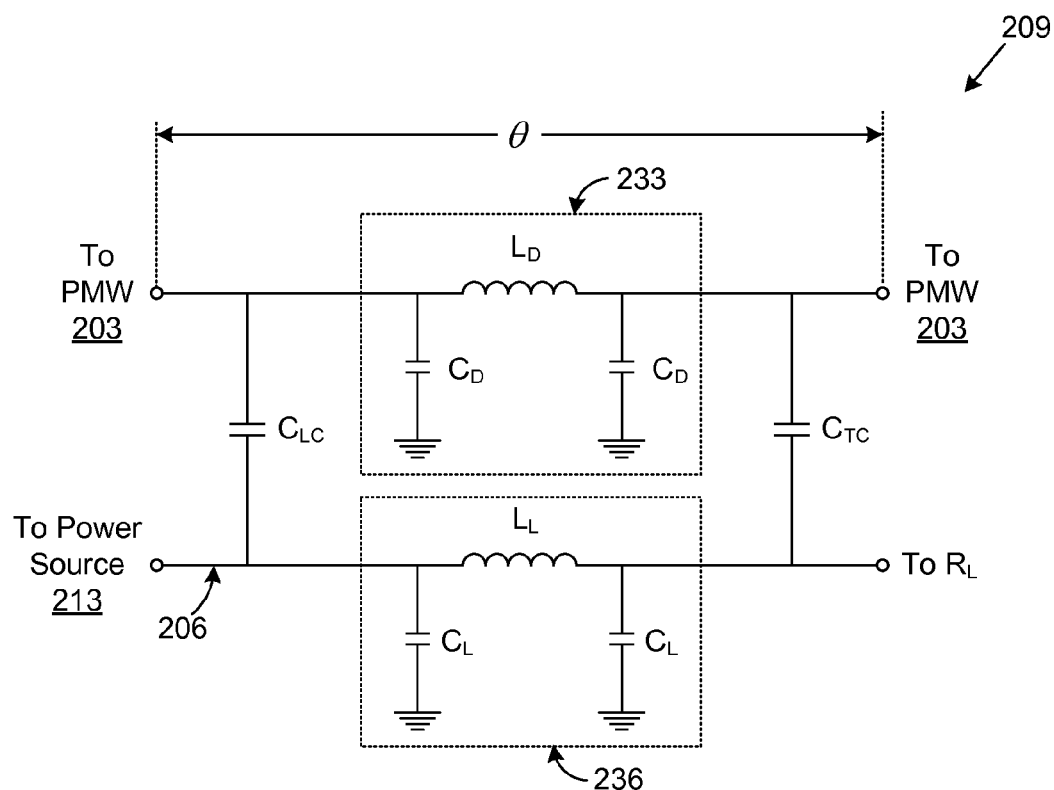
FIG. 10 is a schematic of a directional coupler employed in the power multiplier of FIG. 8 according to one embodiment.

With reference to FIG. 10, shown is a schematic that illustrates an example of the directional coupler 209 according to an aspect of the present invention. The directional coupler 209 comprises a number of lumped-elements. Such a directional coupler 209 ensures that the traveling wave propagates in a single direction along the power multiplying network 203 and to achieve the reinforcement of the traveling wave with the portion of the exciting traveling wave that propagates through the launching network 206. The directional coupler 209 includes the quarter wavelength delay circuits 233 and 236. Note that the directional coupler 209 may also be depicted as including the matching load $R_L$ (FIG. 8).

With the foregoing discussion of the power multiplying network 203, the directional coupler 209, and the phase shifter 219, the total phase shift presented by the power multiplying network 203 may be determined as follows:

$$\phi_{PMW} = \phi_s(N-1) + \phi + \theta,$$

where N is equal to the number of sections in the power multiplying network 203.

In addition, the diverter (FIG. 8) may be constructed in a manner similar to the directional coupler 209 in which the values of the coupling capacitances are used to control the rate at which energy exists the power multiplying network 203.

With reference back to FIG. 8, once we have determined the values for the inductances L and capacitances C per section of the power multiplier 200 that comprises T-networks 183 (FIG. 6A) or π-Networks 186 (FIG. 6B), then actual power magnification that can be achieved by the resulting power multiplier 200 given the values for the lumped-elements (i.e. the shunt capacitances C and the series inductances L) may be determined. Specifically, the lumped-elements are specified to achieve a predefined phase shift per section at the predefined operating frequency.

The progression of calculations that is performed to determine the values for the lumped elements 216 such as the capacitances C and inductances L of the power multiplier 200 is now discussed. In the follow calculations, the assumption is made that each section of the power multiplying network 203 comprise π-networks 186 (FIG. 6B). To begin, the operating frequency f of the power multiplier 200 is specified. Also, both the inductance L and capacitance C of each section of the power multiplying network 203 are specified based upon the values for such elements identified above. In addition, a quality factor Q is specified for the inductances L of each section of the power multiplying network 203. The frequency in terms of radians/sec is calculated as $$\omega = 2\pi f \text{ radians/sec.}$$

Also, the resistance in each of each inductance L is calculated as $$r = \frac{\omega L}{Q} \text{Ohms}.$$

Thereafter, the impedance $Z_C$ is calculated as follows:

$Z_C = r + i\omega L$ Ohms, where "i" represents $\sqrt{-1}$ as is known by those with ordinary skill in the art. Given the capacitances C specified above, the shunt impedances $Z_A$ and $Z_B$ are calculated as follows:

$$Z_A = Z_B = \frac{1}{i\omega C} \text{Ohms}.$$

Next, the characteristic impedance $Z_0$ is calculated as follows:

$$Z_0 = Z_A \sqrt{\frac{Z_C}{(Z_C + 2Z_A)}} \text{ Ohms}.$$

The characteristic impedance is defined as the ratio of the forward wave voltage over the forward wave current. In this respect, a physical measurement of the characteristic impedance of each section may be taken and compared with the calculated characteristic impedance $Z_0$ to verify the accuracy thereof.

In addition, the propagation constant γ per section is calculated as follows:

$$\gamma = a \tanh\left[\frac{\sqrt{Z_C(Z_C + 2Z_A)}}{(Z_A + Z_C)}\right].$$

The Attenuation Constant α per section and the Phase Constant β per section are defined as $\alpha_{section} = Re(\gamma)$Nepers/section, and $\beta_{section} = Im(\gamma)$radians/section.

The phase shift per section may then be calculated as $\phi = (57.296 \text{Deg/Rad})\beta_{section}$Degrees The velocity of the traveling wave in sections per second propagating along the power multiplying network 203 is calculated as $$v = \frac{\omega}{\beta_{section}} \text{sections/second}.$$

Next, the electrical circumference $C_\lambda$ of the power multiplying network 203 is specified in terms of wavelengths at the operating frequency in degrees as $C_{Deg} = C_\lambda (360 \text{ Degrees/wavelength})$Degrees.

Next, the number of sections N (either T-networks or π-networks) is calculated as $$N = \frac{C_{Deg}}{\phi}.$$

Once the number of sections N is known, then the loss resistance $R_C$ around the closed path of the power multiplying network 203 may be calculated as $R_C = Nr$ Ohms.

where r is as defined above. The field propagation decay A for a single traversal of the power multiplying network 203 may be calculated as $A = e^{-\alpha_{section} N}$.

The attenuation $A_{dB}$ around the power multiplying network 203 is calculated as $A_{dB} = -20 \log(A)$.

The pulse duration T of a peripheral disturbance is calculated as $$\tau = \frac{N}{V} \text{seconds}.$$

The power magnification M of the power multiplier 200 at optimum coupling is calculated as $$M = \frac{1}{(1 - A^2)}.$$

The power magnification $M_{dB}$ expressed in decibels is calculated as $M_{dB} = 10 \log(M)$.

The optimum coupling $C_{opt}$ is calculated as $C_{Opt} = 1 - A^2$.

The optimum coupling $C_{opt}$ is calculated in decibels (dB) as $C_{optdB} = 10 \log(C_{opt})$dB.

In addition, a useful reference that may be consulted to determine the various elements of the directional coupler 209 and the phase shifter 219 is Matthaei, G. L., L. Young, and E. M. T. Jones, *Microwave Filters, Impedance Matching Networks, and Coupling Structures*, McGraw-Hill, 1964, (see Chapter 14). While specific circuit designs may be discussed herein that may be employed as the directional coupler 209 and the phase shifter 219, it is understood that other circuit designs and circuit structures may be employed as well, such alternative designs falling within the scope of the present invention.

Power Multiplication and Parametric Excitation

Figure 11:
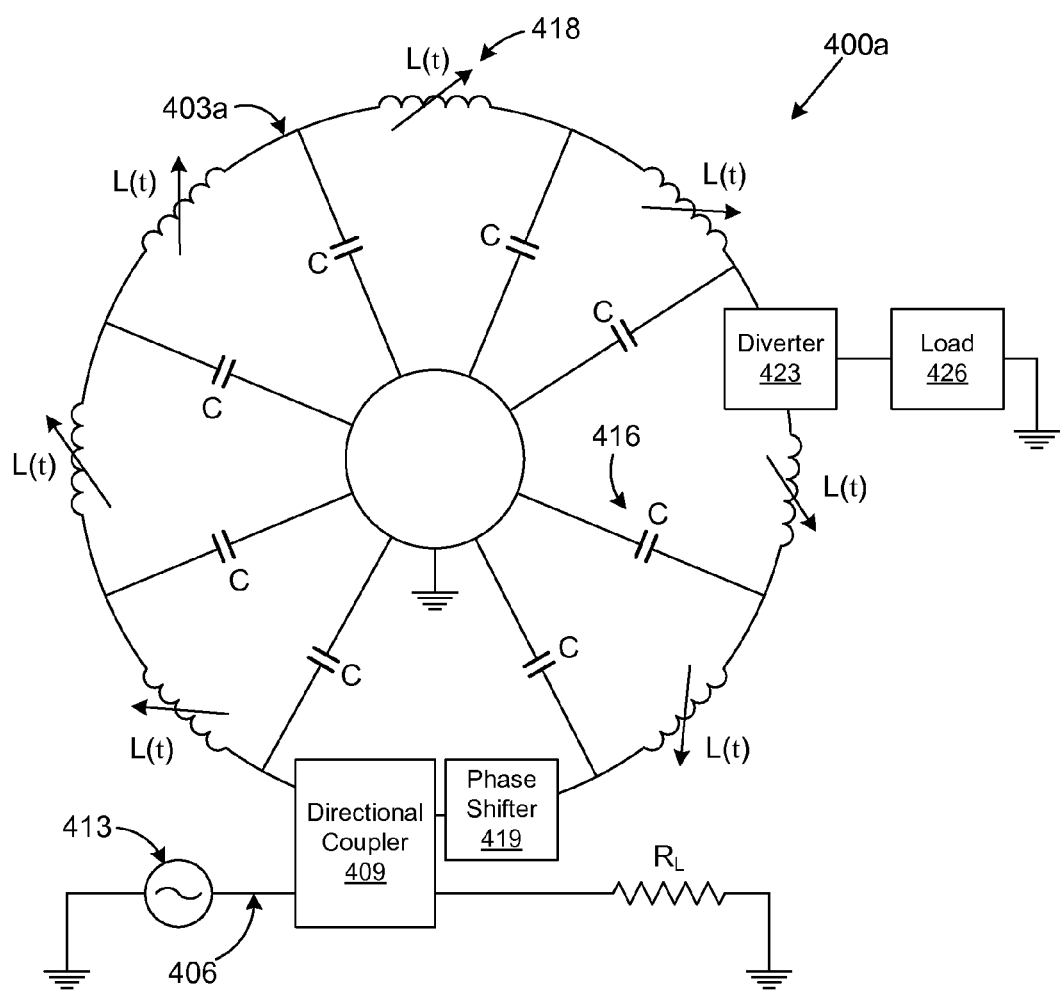
FIG. 11 is schematic of a power multiplying network according to one embodiment.
Figure 12:
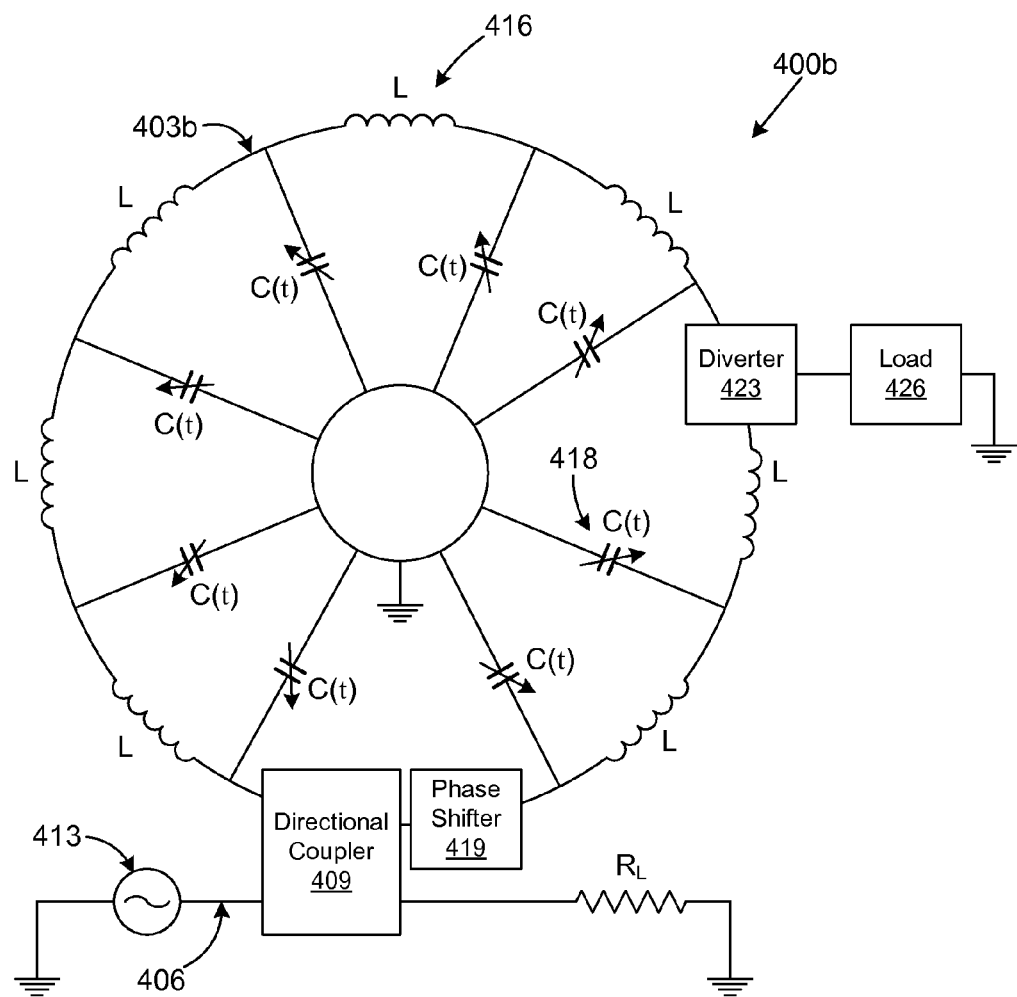
FIG. 12 is a schematic of a power multiplying network according to one embodiment.

With reference to FIGS. 11 and 12, shown are drawings of power multipliers 400a and 400b that employ parametric excitation according to various embodiments of the present invention. The power multipliers 400a and 400b each include a respective power multiplying network 403a and 403b and a launching network 406. Each of the power multiplying networks 403a/403b comprises a ring as mentioned above. The launching network 406 also includes a directional coupler 409 that couples the launching network 406 to the respective power multiplying networks 403a/403b. A power source 413 is coupled to the launching network 406. Also, the launching network 406 is terminated in a matching load $R_L$.

In addition, the each of the power multiplying networks 403a/403b further comprises a phase shifter 419. The phase shifter 419 comprises a circuit constructed from lumped-elements that is combined in series with a portion of the directional coupler 409 to make up the inductance L(t)/L of the specific section within which the directional coupler 409 is located.

Each of the power multiplying networks 403a/403b also includes a diverter 423 that couples the respective power multiplying network 403a/403b to a load 426. The diverter 423 is defined herein as an electrical element or circuit that may be employed to divert or redirect all or a portion of a traveling wave from one of the power multiplying networks 403a/403b to the load 426. In this respect, the diverter 423 may comprise, for example, a switch, relay, solid state switch, plasma switch, or other device with like capability. The diverter 423 may also be a circuit that presents an electric window that is biased using a predefined control voltage or current to divert the energy within a traveling wave to the load 426, depending upon the state of the control voltage or current, etc.

In the embodiment shown in FIGS. 11 and 12, each of the power multiplying networks 403a/403b is constructed from reactances 416 and parametric reactances 418 that, according to one embodiment, comprise lumped-elements. As shown in FIG. 11, the reactances 416 comprise capacitances C (FIG. 14) and inductances L (FIG. 15) and the parametric reactances 418 comprise parametric inductances L(t) (FIG. 14) and parametric capacitances C(t). Alternatively, the parametric reactances 418 in a single power multiplier may include both parametric inductances L(t) and parametric capacitances C(t).

In one embodiment, the parametric reactances 418 such as the parametric inductances L(t) or the parametric capacitances C(t) may comprise linear or non-linear reactances. Thus, the parametric inductances L(t) may comprise linear or non-linear inductances and the parametric capacitances C(t) may comprise linear or non-linear capacitances. As described herein, a linear circuit component is one in which the impedance of the circuit component is not a function of the magnitude of a voltage signal in the circuit component.

Examples of linear reactances may comprise, for example, conventional air-core coils of wire, capacitors, and similar lossless passive circuit elements composed of media with linear permeability ($\mu$) and linear dielectric permittivity ($\in$). Sections of transmission lines (and waveguides) constructed of linear media may also supply examples of linear reactances as viewed at their inputs.

Examples of non-linear reactances may comprise reactive elements with a nonlinear impedance relationship between voltage and current. Such reactive elements may include saturable reactors, varactor (varicap) diodes with voltage variable junction capacitance, and elements constructed of nonlinear permittivity [$\in = \in(V)$], where permittivity is a function of voltage] or nonlinear permeability [$\mu = \mu(I)$, where permeability is a function of current], as is the case in transmission line elements with magnetically biased ferrites, and even plasma media.

Time-varying reactive elements also occur in engineering practice. Common examples of time-varying reactances are inductors and capacitors whose permittivity and permeability functions are pumped in time by a control voltage or current. Similarly, distributed time-varying impedances have their constitutive parameters pumped by a control signal, which may be electrical, electromagnetic, optical, thermal, mechanical, acoustical, etc.

The power multipliers 400a and 400b are operated in order to multiply power in much the same way as the power multiplier 200 (FIG. 8) with the exception that the parametric reactances 418 are varied in time as will be described below. As a result of the variation of the parametric reactances 418, a negative resistance is introduced into the power multiplying networks 403a/403b that effectively electrically negates the physical resistance inherent in the components of the power multiplying networks 403a/403b. Consequently, the power multipliers 400a/400b can accumulate a drastically greater amount of power in a traveling wave within the power multiplying networks 403a/403b. In the case that the physical resistance of a respective power multiplying network 403a/403b is almost completely negated, then the power multiplying network 403a/403b may actually approach superconductivity.

Recall as described above that in a power multiplier 200 (FIG. 8) that does not employ parametric excitation (does not make use of parametric reactances), power will continue to build up in the power multiplying network 203 (FIG. 8) (or the ring) during operation until the losses due to the inherent resistance of the power multiplying network 203 plus the losses in the matching load $R_L$ that terminates the launching network 406 is equal to the power generated by the power source 413. Given the use of parametric reactances 418 in the power multiplying networks 403a/403b, the physical resistance of the power multiplying networks 403a/403b are negated by the negative resistance introduced due to the parametric excitation of the parametric reactances.

Thus, if the physical resistance was reduced due to the negative resistance injected in the power multiplying networks 403a/403b, the power of the traveling wave in the power multiplying networks 403a/403b will continue to build up until the losses due to the reduced physical resistance and due to the matching load equal the power generated by the power source 413. As the negative resistance injected into a power multiplying network 403a/403b approaches the total physical resistance of a respective one of the power multiplying networks 403a/403b, then the power multiplying networks 403a/403b approach superconductivity. However, it may be the case that there are limits to how closely the negative resistance can approach the actual physical resistance of the respective power multiplying network 403a/403b, where the actual amount of negative resistance depends upon the magnitude and phase of the variation in the parametric reactances that make up part of the power multiplying network 403a/403b. Thus, the actual amount of negative resistance generated is application specific.

According to the various embodiments, one or more parametric reactances 418 in the power multiplying networks 403a/403b are varied in time at a frequency that is in a predefined relationship relative to the operating frequency of the power source 413. That is to say, the frequency of at which the parametric reactances 418 are varied in time is in a predefined relationship relative to the frequency of a traveling wave in the ring of the power multiplier 400a/400b.

To explain further, if a signal at frequency $f_s$ is injected into a linear, tuned circuit such as an LC circuit, which has a reactive element changing at frequency $f_p$ (called the "pump" frequency), a new mixer frequency (called the idler frequency, $f_i$) will appear in the circuit. The relation between these three frequencies is as follows:

$$f_i = mf_p \pm nf_s.$$

If the reactance element is varied at a frequency $f_p$ (the pump frequency) in a 2:1 ratio to the resonant frequency (which is also tuned to the signal frequency $f_s$) of the circuit, then the difference or idler frequency $f_i$ will be the same as the signal frequency $f_s$.

If the operating point of the reactance element is varied at one frequency, and an oscillator signal is coupled into the circuit at another frequency, under certain conditions between the two frequencies, the circuit impedance, instead of being a pure imaginary, will become complex. The imaginary component could correspond to an inductive reactance, but a negative real part can arise, effectively corresponding to a negative resistance injected into the circuit. The amount of negative resistance injected into the circuit is controlled by the relative magnitude and phase at which the reactance element is varied.

According to various embodiments, the negative resistance arises when the pump frequency $f_p$ is equal to twice the signal frequency $f_s$ of the circuit. In this "degenerate" mode of operation, where both m and n=1 and $f_p=2 \times f_s$, the idler frequency $f_i$ is equal to the signal frequency $f_s$. Therefore, when the pump frequency $f_p$ is equal to twice the signal frequency ($2 \times f_s$), a negative resistance is injected into the circuit.

According to the various embodiments of the present invention, which, by design, possess small dissipation, the parametric reactances 418 are varied at a frequency that is twice the frequency of the power source 413 (and the generated traveling wave flowing through the ring) of the power multiplier 400a/400b. When this condition is met, the parametric reactance effectively negates at least a portion of the physical resistance inherent in the power multiplying networks 403a/403b. The degree to which the physical resistance inherent in the power multiplying networks 403a/403b is negated depends upon the magnitude of the negative resistance generated by the operation of the parametric reactances. The magnitude of the negative resistance depends upon the magnitude and phase of the variation of the parametric reactances 418 and is design specific as described above.

While, in one embodiment, a ratio of 2:1 is specified between the frequency of variation of the parametric reactances 418 and the frequency of the power source 413 (or traveling wave in the ring) in order to generate the negative resistance in the power multiplying networks 403a/403b, it is understood that other frequency relationships between the frequency of variation of the parametric reactances 418 and the frequency of the power source 413 may be specified in order to generate the negative resistance in the power multiplying networks 403a/403b. For example, to aid in determining such other frequency relationships between the frequency of variation of the parametric reactances 418 and the frequency of the power source 413, see the topic of Mathieu's Equation in Cunningham, W. J., *Introduction to Nonlinear Analysis*, McGraw-Hill, 1958, pp. 259-280) on circuit dissipation.

As Cunningham demonstrates, growing oscillations (negative resistance) and regions of instability may occur in second order systems for certain other noninteger (i.e. not commensurable) frequency ratios, which, in the presence of damping, also depend upon system dissipation as well as the amplitude and phase of the parameter variation. These are commonly manifested as the region of instability "tongues" in the solutions of Mathieu's equation. Also, see Kharkevich, A. A., *Nonlinear and Parametric Phenomena in Radio Engineering*, John F. Ryder Publisher, Inc., 1962, pp. 166-166; Mandelshtam, L. I. and Papaleksi, N. D., "On the Parametric Excitation of Electric Oscillations," Soviet Journal of Technical Physics, Vol. 4, No. 1, 1934, pp. 5-29. See FIG. 1, p. 9.) Such other frequencies may also be employed, although efficiency may suffer at such other ratios.

The parametric reactances 418 may be implemented using any one of a number approaches. In particular, the parametric reactances 418 may be created electrically, mechanically, thermally, or via some other approach. Specific examples include the creation of a parametric inductance L(t) using a magnetic amplifier that involves varying the permeability μ of a core about which an inductor is wound. As the permeability μ is altered, so is the inductance of the winding. Also, in another example, the parametric capacitance C(t) may be created using a dielectric amplifier in which the permittivity ∈ of a dielectric associated with the parametric capacitance C(t) is varied over time. As the permittivity ∈ is varied, the resulting capacitance of the parametric capacitance C(t) is varied. Also, the parametric reactance may be created mechanically using wheels and the like. For a more detailed discussion as to the various devices that may be used or approaches taken to implement the parametric reactances 418, reference is made to the following papers:

Manley, J. M. and Peterson, E., "Negative Resistance Effects in Saturable Reactor Circuits," *AIEE Transactions*, Vol. 65, December 1946, pp. 870-88;

Mandelstam, L., Papalexi, N., Andronov, A., Chaikin, S., and Witt, A., "Report on Recent Research on Nonlinear Oscillations," *Technical Physics of the USSR, Leningrad*, Volume 2, Number 2-3, pp 81-134, 1935;

Mumford, W. W., "Some Notes on the History of Parametric Transducers," *Proceedings of the IRE*, Vol. 48, May 1960, pp. 848-853; and Raskin, J-P., Brown, A. R., Khuri-Yakub, B. T., Rebeiz, G. M., "A Novel Parametric-Effect MEMS Amplifier," Journal of Microelectromechanical Systems, Vol. 9, December 2000, pp. 528-537.

Each of these references is incorporated herein by reference in their entirety.

According to one embodiment, the power multipliers 400a and 400b are each described as including a power multiplying network 403a/403b comprising a multiply-connected, velocity inhibiting circuit constructed from a number of lumped-elements.

In addition, the term "lumped" is defined herein as effectively concentrated at a single location. Thus, the terms "lumped-elements" refer to discrete, two-terminal, concentrated electrical elements such as capacitance, inductances, resistance, and/or conductance. Thus, the lumped-elements as described herein may comprise discrete inductors, capacitors, or resistors. In addition, as contemplated herein, lumped-elements may also comprise diodes, transistors, and other semi-conductors that may be described, for example, as nonlinear resistors or conductors that have resistance or conductance that is controlled by the polarity of applied voltages or currents, etc. In addition, lumped-elements may also comprise inherent capacitances, inductances, resistances, or conductances of various electrical structures such as helices, parallel plates, or other structure as will be discussed. Similar to the power multiplying network 203, the directional coupler 209 is also constructed using lumped-elements.

Lumped elements are circuit components for which the parameters inductance, capacitance, resistance, and conductance have the same meaning as in the static situation. That is to say, the first order terms in the electromagnetic power series solution of Maxwell's equations are adequate to describe "lumped element" networks. This usually occurs when the dimensions of the components, including interconnections, is very small compared to the wavelength of operation. As the ratio of network dimension to wavelength is decreased, Maxwell's rigorous field equations transition to the distributed-element transmission line equations of Heaviside, and, in the limit, these pass to the lumped element circuit equations of Kirchoff. Only the latter are necessary to describe electrical circuits operating in the lumped element regiem of conventional electronic circuit theory. No spatial integrals or spatial derivatives are necessary to analyze discrete component networks as would be required for distributed-elements and radiating circuits.

According to various embodiments, the parametric excitation as described above applies to power multipliers that comprise distributed element circuits as well. A distributed element circuit is a circuit whose reactance (inductance and/or capacitance) are distributed over a physical distance that is comparable to an operating wavelength of the circuit. Power multipliers that include a ring comprising a distributed element circuit include those that substantially are not velocity inhibiting circuits. For distributed element power multipliers, Maxwell's rigorous field equations transition to the distributed-element transmission line equations of Heaviside. A distributed element power multiplier are analyzed using spatial integrals or spatial derivatives. A distributed element power multiplier is one with a waveguide comprising a ring with a physical circumference that is an integer multiple of the wavelength $\lambda_w$ of an exciting traveling wave that accumulates in the ring. It follows that for a distributed element power multiplier to be practical, the frequency of operation is relatively high, resulting a relatively small structure that can be practically constructed. In this respect, the power multiplier 100 (FIG. 1) comprises a distributed element power multiplier.

In another embodiment, the principles of parametric excitation of a power multiplier described above with reference to the lumped-element power multipliers 400a/400b apply equally to distributed element power multipliers. The reactance parameters of distributed ring power multipliers may be varied in space and time ("pumped") appropriately by any one of a variety of means. For example, the transmission line electrical parameters may be pumped by employing a magnetically biased plasma. They may be pumped by using a magnetically biased permeability varying in space and time, $\mu(x,t)$. Also, they may be pumped appropriately by using a voltage-controlled electrical permittivity, $\in(x,t)$, in the transmission line. Such techniques, obviously, have the effect of pumping the inductance per unit length $L(x,t)$ and the capacitance per unit length $C(x,t)$, respectively, at the desired pump frequency and phase. For one discussion of techniques for pumping reactance variations in the context of conventional distributed element parametric amplifiers, reference is made to Louisell, W. H., *Coupled Mode and Parametric Electronics*, John Wiley and Sons, Inc., 1960, pp. 131-147, and the references cited and discussed therein, which is incorporated herein by reference.

The power multipliers described (i.e. the power multipliers 400a/400b, and other embodiments such as distributed element power multipliers) above that employ the principles of parametric excitation may be employed in the same manner as the power multipliers 200 and 250 described above. For example, the power multipliers 400a/400b may be employed for power smoothing with respect to power distribution networks 300 as described above. Also, the power multipliers 400a/400b (or distributed element power multipliers employing parametric excitation) may be employed in any other situation where the multiplication or storage of power is desired, where the essential difference between the power multipliers that employ parametric excitation and the power multipliers that do not is that the power multipliers that employ parametric excitation can buildup or store a vastly greater amount of power due to the fact that the physical resistance in the rings associated with such power multipliers is negated as described above.

Power Processing

Figure 13:
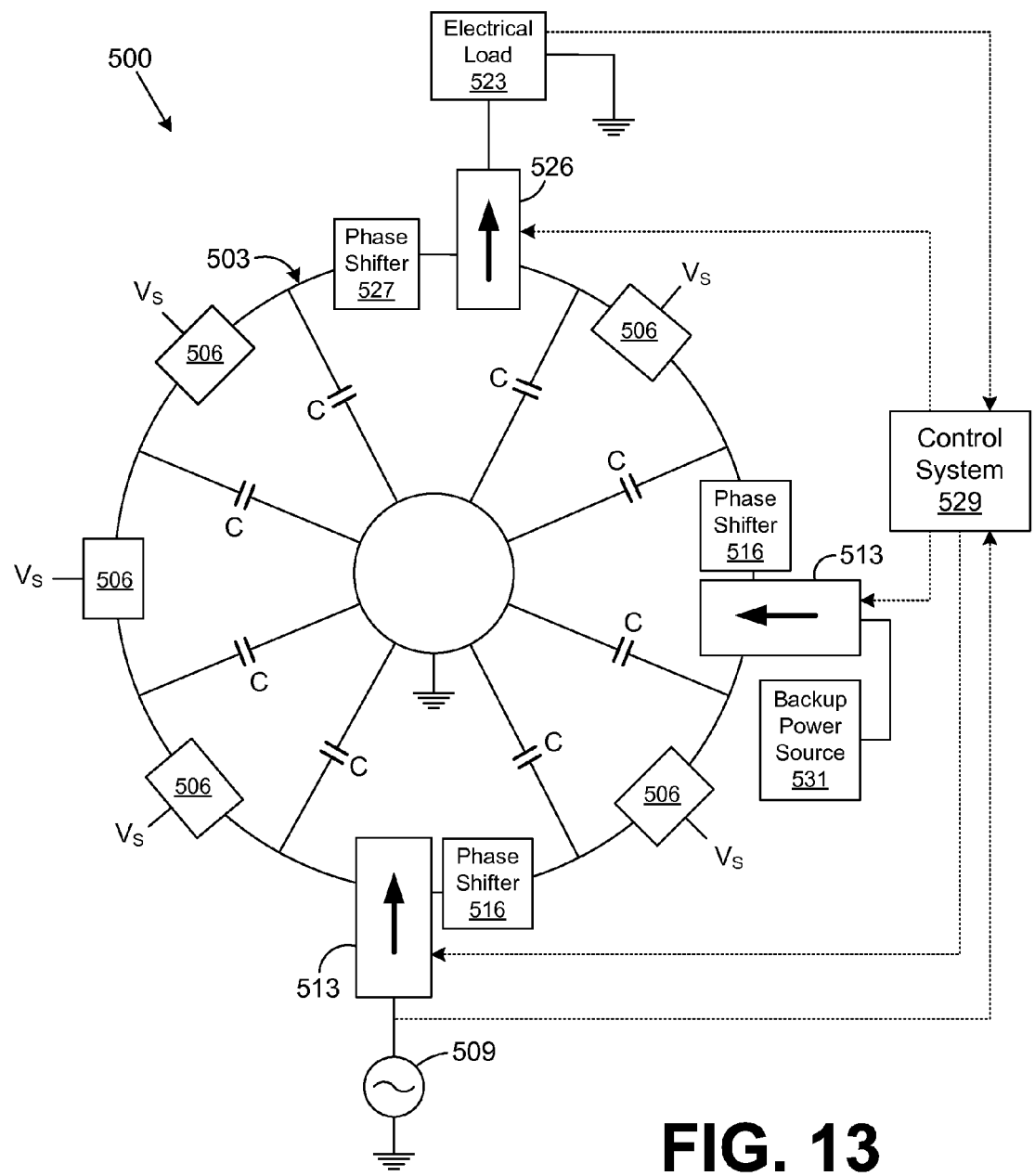
FIG. 13 is a schematic of one example of a multiply-connected power processor according to one embodiment.

With reference to FIG. 13, shown is a multiply-connected power processor 500 according to various embodiments. The multiply-connected power processor 500 includes a power processing network 503. According to one embodiment, the power processing network 503 is a multiply-connected velocity inhibiting circuit. The power processing network 503 includes parallel capacitors C and active circuits 506 that are coupled in series around the power processing network 503 as shown. The active circuits 506 synthesize a passive lumped element in the power processing network 503. In particular, the active circuits 506 are configured to synthesize an inductance such as, for example, the inductances L as described above, for example, with reference to FIG. 8.

An alternating current (AC) power source 509 is coupled to the power processing network 503 by a source coupling 513. The AC power source 509 may be, for example, one or more generators on a power grid or other generator. Such AC power sources 509 typically operate at power frequencies such as 50 Hz., 60 Hz., 400 Hz., or other power frequency. Alternatively, the AC power source 509 may be some other type of source that can operate at virtually any frequency for which the power processing network 503 is designed.

The source coupling 513 comprises, for example, a directional coupler as will be described below. A phase shifter 516 is included in the power processing network 503 in series with the source coupling 513. The phase shifter 516 provides for adjustment of the total impedance presented by the source coupling 513 relative to the rest of the power processing network 503 to ensure that the electrical length of the power processing network 503 is a multiple of a wavelength of a resonant frequency of the power processing network 503.

Coupled to each of the active circuits 506 is a power source $V_S$ that provides power to the active circuit 506 so that it may properly function. The power source $V_S$ may be, for example, a direct current (DC) power source or an alternating current (AC) power source. In one embodiment, the active circuit 506 may include rectification circuitry in order to convert an AC power source to DC power in order to provide DC power to various components included therein. The active circuit 506 may employ various types of circuit components such as, for example, operational amplifiers or other active circuitry as will be described.

An electrical load 523 is coupled to the power processing network 503 by way of a load coupling 526. The load coupling 526 may comprise, for example, a reverse directional coupler as will be described below. In addition, a phase shifter 527 is included in the power processing network 503 in series with the load coupling 526 to adjust the total impedance presented by the load coupling 526 and the phase shifter 527 in conjunction with the design of the power processing network 503. The source coupling 513 and the load coupling 526 each may be controlled so as to vary the amount of power that they couple into and out of the power processing network 503 at any given time as will be described.

Where the power sources $V_S$ are direct current power sources, they may comprise any one of a number of different types of direct current power sources such as, for example, batteries, solar cells, rectified AC sources, or other DC sources as can be appreciated. Also, where the power sources $V_S$ comprise AC power sources, such may comprise conventional utility power sources, AC power generated by wind farms, water current generation systems, or other generators as can be appreciated. Such generators may be may be nuclear reaction based, solar, chemical and electrochemical, thermal (including geothermal, plasma, as well as combustion), and mechanical energy conversion devices.

The multiply-connected power processor 500 further comprises a control system 529 that controls the operation of the source coupling 513 and the load coupling 526 based upon an input from the electrical load 523 as will be described. The control system 529 may comprise a digital or analog control system as can be appreciated. In one embodiment, the control system 529 employs a processor circuit or other type of digital circuitry.

In addition, a backup power source 531 may be coupled to the power processing network 503 using a source coupling 513 with a corresponding phase shifter 516. The backup power source 531 may comprise, for example, a backup generator or other AC power source. Further, backup batteries may be employed where an AC power signal is generated therefrom using a DC to AC converter as can be appreciated.

Next, a general discussion is provided as to the operation of the multiply-connected power processor 500 according to the various embodiments. To begin, the AC power generation source 509 generates AC power that is applied to the power processing network 503 through the source coupling 513. The electrical length of the power processing network 503 is designed to be a multiple of the wavelength of the signal generated by the AC generation source 509. As a consequence, the power processing network 503 resonates at the frequency of the AC generation source 509. The active circuits 506 effectively synthesize or emulate the passive inductances as described above. Where the multiply-connected power processor 500 is designed to resonate at low frequencies such as power frequencies (i.e. 50 Hz, 60 Hz, or 400 Hz), the active circuits 506 may be much smaller in size than the physical passive inductances they emulate.

The multiply-connected power processor 500 processes the power generated by the AC generation source 509 that enters the power processing network 503. In this respect, the multiply-connected power processor 500 can input unprocessed power through the source coupling 513 and outputs "clean" AC power to the load 523 through the load coupling 526. Unprocessed power is power that is subject to various anomalies such as transients, harmonics, voltage surges, voltage sags, brownouts, or other problems. Once the power is coupled into the multiply-connected power processor 500, the power is processed by virtue of the characteristics and operation of the multiply-connected power processor 500 to minimize or eliminate any of the above anomalies so as to output clean power to the load 523.

To explain further, the power generated by the AC power generation source 509 is coupled into the power processing network 503 and travels around the power processing network 503 as a traveling wave at the resonant frequency of the power processing network 503 as described above. The active circuits 506 emulate or synthesize inductances in the power processing network 503 such that the power processing network 503 has an electrical length that is a multiple of the wavelength of the signal generated by the AC power generation source 509. The control system 529 controls the load coupling 526 to divert power out of the power processing network 503 to the electrical load 523 as dictated by the power demand of the electrical load 523 at any given instant.

The control system 529 also controls the source coupling 513 to control the amount of power that enters the power processing network 503 at any given instant. The source coupling 513 can be manipulated by the control system 529 to input power at a rate that is equal to the rate at which power is diverted out of the ring by the load coupling 526. Also, the control system 529 may manipulate the source coupling 513 to input power into the power processing network 503 to maintain an elastic reservoir of power at any given instant. Specifically, the control system 529 may be configured to maintain or store a predefined amount of power in the power processing network 503. The actual power storage capacity of the power processing network 503 depends upon the power rating or capacity of the active circuits 506. The energy stored in the power processing network 503 may be input into the power processing network 503, for example, at initial startup when first applying power to the electrical load 523 or at any other time. To build up excess energy in the power processing network 503, the control system 529 controls the source coupling 513 to input more power into the power processing network 503 than is routed to the electrical load 523 through the load coupling 526. To this end, a gain is associated with the operation of the power processing network 503 to the extent that power can build up in the form of the traveling wave.

Once a desired amount of power is stored in the power processing network 503, when greater amounts of power are demanded by the electrical load 523, the control system 529 may be configured to respond by manipulating the load coupling 526 to divert a greater amount of power from the power processing network 503 to the electrical load 523. At the same time, the source coupling 513 may be manipulated to increase the power input into the power processing network 503 by the same amount so that the amount of power stored in the power processing network 503 remains substantially constant.

The power from the AC power source 509 may experience various anomalies from time to time. For example, it may be the case that voltage sags or brownouts occur due to various activity on the power grid to which the AC power source 509 is coupled. A voltage sag is a drop in the magnitude of the power signal below nominal values usually for a short period of time measured in several milliseconds, although a voltage sag may have any time duration. A brownout is a short term loss of power usually measured in terms of several cycles of the power signal. The multiply-connected power processor 500 protects the electrical load 523 from voltage sags and brownouts by storing excess power in the power processing network 503 that may be diverted from the power processing network 503 to the load 523 to compensate for the loss of power represented by a voltage sag or brownout. Given that the power capacity of the active circuits 506 may limit the amount of power that can be stored in the power processing network 503, the capacity of the power processing network 503 to compensate for a voltage sag or brownout is limited by the amount of power that can be stored in the power processing network 503.

Also, the power processing network 503 may be employed to absorb voltage surges or overvoltages, thereby preventing such voltage surges or overvoltages from reaching the electrical load 523 and potentially causing physical damage. Typically, voltage surges or overvoltages may last several cycles of the power signal, although it is possible they may last for much longer. To this end, the control system 529 may be configured to maintain the power in the power processing network 503 below full capacity in order to be able to absorb voltage surges or overvoltages by storing the excess energy in the power processing network 503.

In addition, the control system 529 receives an input indicating the magnitude of the power voltage from the AC power source 509. Based upon this input, the control system 529 may manipulate the source coupling 513 to input a lesser amount of power into the power processing network during an occurrence of a voltage surge or overvoltage. Thus, the power processing network 503 may be configured to absorb an initial amount of excess energy from a voltage surge until the control system 529 can react to reduce the rate at which power is input into the power processing network 503. When the voltage surge or overvoltage is over and the power voltage from the AC power source 509 has returned to nominal, the control system 529 can adjust the source coupling 513 to reestablish the rate of power input that existed before the voltage surge or overvoltage. The ability of the power processing network 503 to store energy in the form of the traveling wave provides a degree of flexibility in responding to anomalies such as voltage surges or overvoltages.

Of course, while adjustments are made to the source coupling 513 resulting in a change in the amount of power stored in the power processing network 503, the load coupling 526 is adjusted to ensure that the amount of power diverted to the electrical load 523 matches the power demand of the electrical load 523 at any given instant. Thus, the control system 529 controls the source coupling 513 based upon detection of anomalies such as voltage surges or overvoltages, and based upon the power demand of the electrical load 523 at any given instant. Ultimately, the reservoir of power stored in the power processing network 503 provides time to allow the control system 529 to react to power input problems while maintaining a clean, robust power output to the electrical load 526.

In addition, by virtue of the resonant nature of the power processing network 503, the power processing network 503 acts as a narrow band pass filter that will filter out all voltage transients or other anomalies in the signal generated by the AC power generation source 509. Voltage transients are aberrations such as high frequency waveforms imposed on top of a power voltage. Voltage transients may be created by various operational activity on an electrical grid or by natural phenomena like lightning. Typical transients have a frequency that differs from the nominal frequency of the power voltage. For example, a voltage transient may comprise a ringwave with oscillating frequencies as high as 100 KHz or more.

Due to the fact that the power processing network 503 acts as a narrowband pass filter at the nominal frequency of the power voltage, such voltage transients or other anomalies are either dissipated in the form of heat in the components of the multiply-connected power processor 500 or are converted into the power signal itself. Ultimately, such unwanted aberrations in the power voltage are prevented from reaching the load 523. In one embodiment, the active circuits 506 employ the power source $V_S$ to overcome any inherent resistance in such active circuits 506 such that they can emulate an ideal inductance without any resistive loss. Also, voltage clamping technologies or other technologies may be employed at the input of the source coupling 513. Such technologies may comprise, for example, metal oxide varistors, zener diodes, gas tubes, or other components that may be employed to clamp the high voltages of transients to acceptable levels before they enter the power processing network 503 to reduce the possibility of damage to the components of the power processing network 503 itself.

In addition, the multiply-connected power processor 500 may be employed to ensure an uninterruptible supply of power to the electrical load 523 due to the backup power source 531 coupled to the power processing network 503 through the additional source coupling 513. Upon a loss of the AC power signal from the AC power source 509, the control system 529 may react by manipulating the additional source coupling 513 to input power into the power processing network 503 from the backup power source 531. Also, the control system 529 may be configured to start up the backup power source 531 when necessary such as might be the case with a backup generator.

In cases where the backup power source 531 needs time to be brought online such as might be the case with a backup generator, the electrical load 523 may be supplied with power from the excess power stored in the power processing network 503. Thus, the AC power storage characteristics of the power processing network 503 can be employed to provide a smooth transition between alternative power sources coupled to the power processing network 503, thereby ensuring that the electrical load 523 never sees an interruption in the power supplied thereto. This is useful for critical loads as can be appreciated.

When the backup power source 531 is first brought up, it is desirable that the phase and frequency of the power signal generated thereby match the phase and frequency of the traveling wave that travels around the power processing network 503. To this end, the phase of the power signal may be dynamically shifted as needed so as to match the phase of the traveling wave in the power processing network 503.

The active circuits 506 may comprise, for example a gyrator circuit or other circuit that facilitates the emulation of the inductances L as described above. In one embodiment, the gyrator circuits employed as the active circuit 506 may synthesize a floating inductance L as will be described. The active circuits 506 may also synthesize a non-floating inductance. Also, the active circuits 506 may comprise a variable amplifier gain that is controlled by the control system 529 in a manner as will be described below. If the active circuits 506 include variable amplifier gain, then they may be manipulated to add power to the power multiplying circuit from the power source $V_S$ in a manner as will be described below.

Figure 14A:
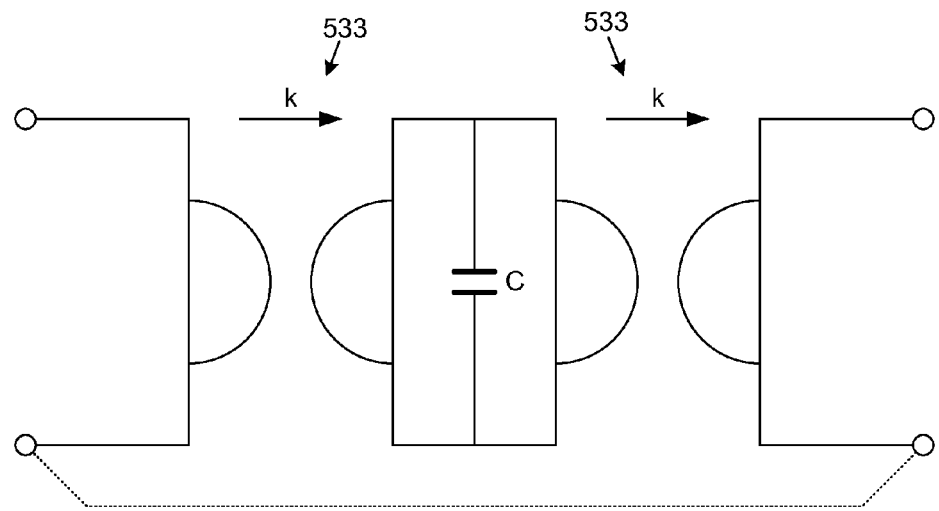
FIGS. 14A and 14B depict examples of a gyrator circuit employed as an active circuit in the multiply-connected power processor of FIG. 13 according to one embodiment.

Referring next to FIG. 14A, shown is a schematic of a gyrator circuit 506a that emulates a floating inductance as can be appreciated. An ideal gyrator is a lossless, passive two-port component with a real constant k called the gyration ratio. A gyrator circuit may be configured to invert an impedance such that it can make a capacitive circuit such as a capacitor behave inductively. Also, a gyrator may cause a band pass filter to behave much like a band stop filter and so on. As shown in FIG. 14A, two gyrators 533 are coupled to a common capacitor C, where two of the leads of the respective gyrators 533 are coupled together internally, thereby forming the gyrator circuit 506a.

Figure 14B:
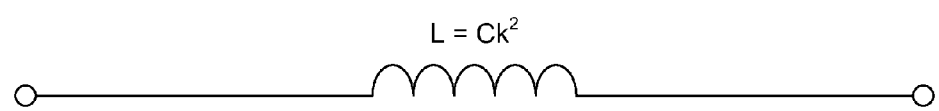

As seen with respect to FIG. 14B, the ultimate result is a circuit that emulates a floating inductance where the two bottom leads are coupled together internally and are not coupled to external devices. The ultimate inductance L of this circuit is calculated as $L=Ck^2$. Thus, the floating inductance may be designed by properly specifying the gyrators 533 and the capacitance C to provide for a desired inductance L to be used in the power processing network 503.

Thus, the gyrator circuit 506a of FIG. 14A is one example of an active circuit 506 that may be employed in the power processing network 503 according to the various embodiments. While the one example is described with respect to FIGS. 14A and 14B, it is further understood that there are many other different types of active circuits that may be employed to emulate an inductance as described with respect to the power processing network 503 of FIG. 13.

It should be noted that the floating inductance presented by the gyrator circuit 506a may be varied dynamically by varying the capacitance C. As such, the gyrator circuit 506a may be employed as a parametric reactance as described above.

Referring back to FIG. 13, in one embodiment, each of the active circuits 506 comprises a gyrator circuit 506a (FIG.

14A) that synthesizes a floating inductance as described above. In addition, the inductances synthesized by the active circuits 506 may be varied parametrically in order to generate a negative resistance in the power processing network 503 as was described above with reference to FIGS. 11 and 12 above. For example, the inductance synthesized by the gyrator circuit 506a (FIG. 14A) may be varied by varying the capacitance C (FIG. 14A).

Also, it should be noted that other circuits beyond the gyrator circuit 506a may be employed as the active circuits 506 to synthesize the inductances of the power processing network 503. In particular, such circuits may comprise, for example, circuits that synthesize non-floating inductances, etc.

Figure 15:
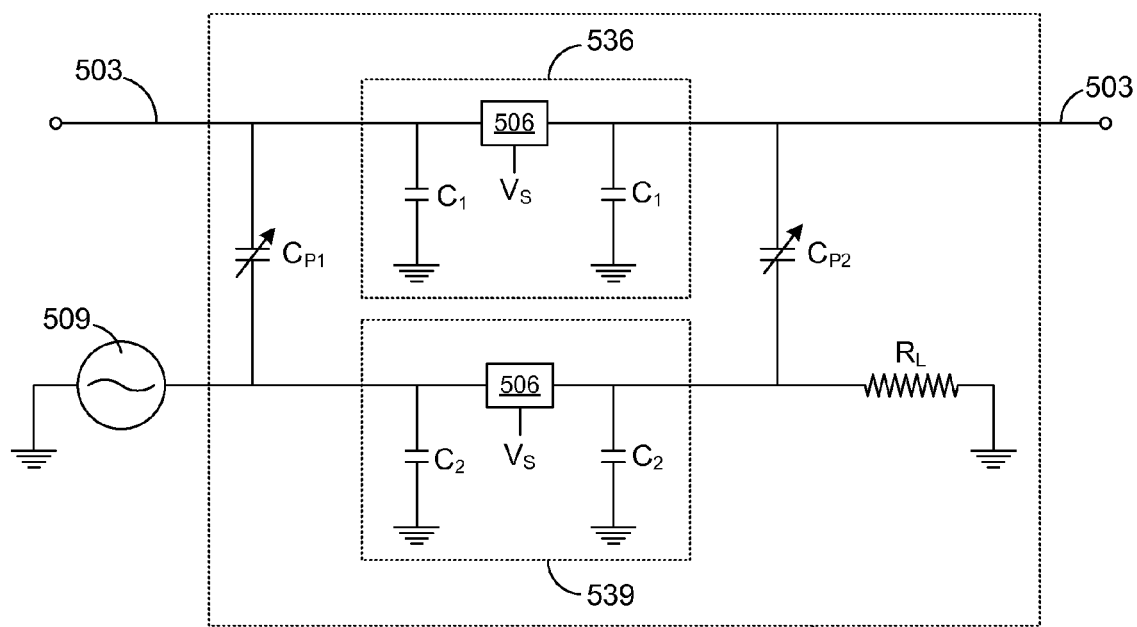
FIG. 15 is a schematic of one example of a source coupling employed in the multiply-connected power processor of FIG. 13 according to one embodiment.

Referring next to FIG. 15, shown is one example of the source coupling 513 according to various embodiments. The source coupling 513 includes coupling capacitors $C_{P1}$ and $C_{P2}$. Also, the source coupling 513 includes quarter wavelength delay circuits 536 and 539. The delay circuits 536 and 539 provide for a quarter wavelength delay in the power signal received from the AC power source 509 as well as the power signal on the power processing network 503. By virtue of the quarter wavelength delay circuits 536 and 539, and the coupling capacitors $C_{P1}$ and $C_{P2}$, at least a portion of the power signal generated by the AC power source 509 is coupled into the power processing network 503 that propagates around the power processing network 503 as described above. The coupling capacitors $C_{P1}$ and $C_{P2}$ are variable capacitors in order to control the amount of power from the AC power source 509 that is actually coupled into the power processing network 503. The active circuits 506 synthesize inductances in each of the quarter wavelength delay circuits 536 and 539 as shown. The control system 529 controls the rate at which power is coupled into the power processing network 503 by controlling the values of the coupling capacitors $C_{P1}$ and $C_{P2}$.

Figure 16:
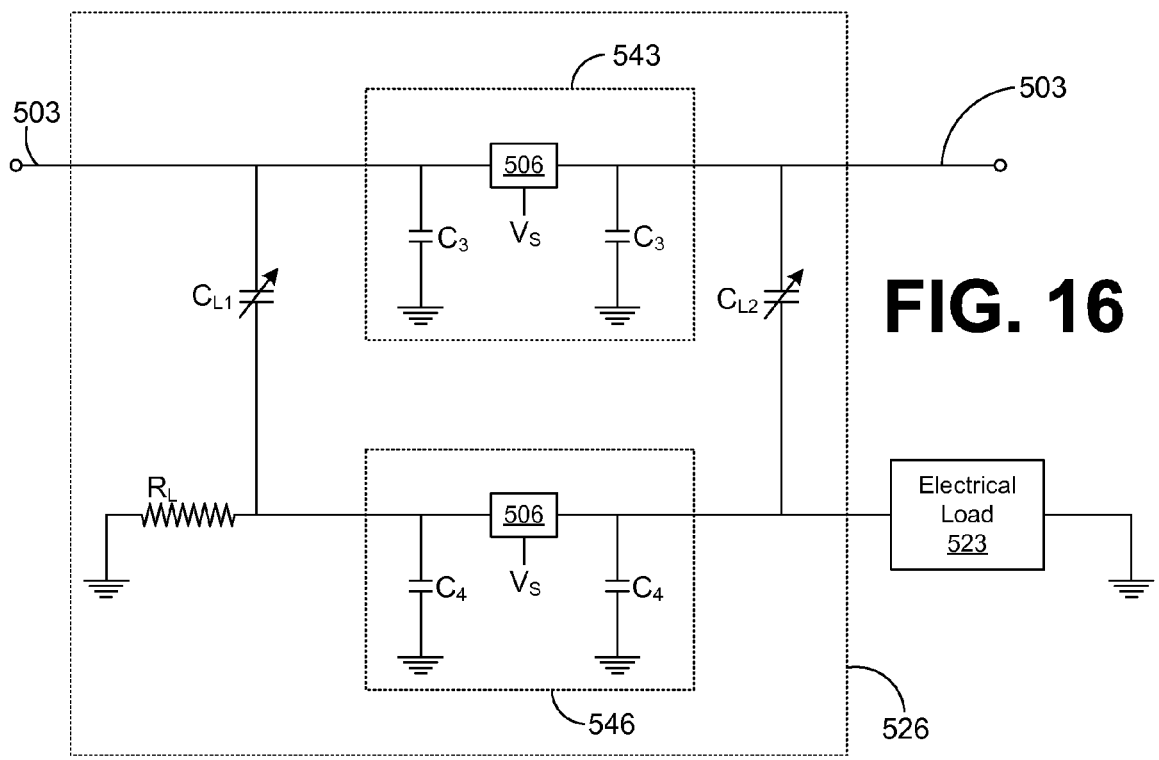
FIG. 16 is a schematic of one example of a load coupler employed in the multiply-connected power processor of FIG. 13 according to one embodiment.

With reference then to FIG. 16, shown is one example of a load coupling 526 according to various embodiments. The load coupling 526 includes coupling capacitors $C_{L1}$ and $C_{L2}$. Also, the load coupling 526 includes quarter wavelength delay circuits 543 and 546. The delay circuits 543 and 546 provide for a quarter wavelength delay in the power signal traveling in the power processing network 503 and in a diverted power signal applied to the electrical load 523. The coupling capacitors $C_{L1}$ and $C_{L2}$ may be variable so as to control the amount of power applied to the electrical load 523 at any given instant. The control system 529 is configured to dynamically control the capacitance of the coupling capacitors $C_{L1}$ and $C_{L2}$ so as to control the amount of power directed to the electrical load 523 based on feedback from the electrical load 523. By virtue of the quarter wavelength delay circuits 543 and 546, and the coupling capacitors $C_{L1}$ and $C_{L2}$, at least a portion of the power signal traveling in the power processing network 503 is coupled to the electrical load 523.

Figure 17:
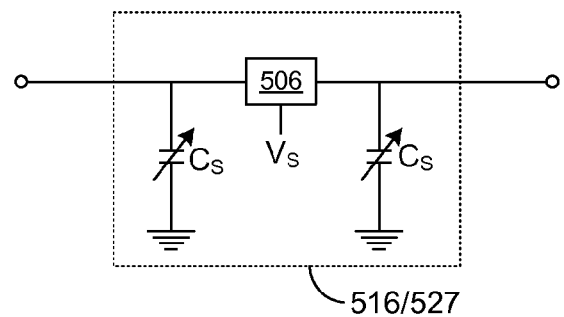
FIG. 17 is a schematic of one example of a phase shifter employed in the multiply-connected power processor of FIG. 13 according to one embodiment.

Referring to FIG. 17, shown is one example of a phase shifter 516/527. The phase shifter 516/527 may include an active circuit 506 that synthesizes an inductance L as can be appreciated. In this respect, the impedance presented by the phase shifter 516/527 may be adjusted as needed. Specifically, the capacitors CS and the active circuit 506 may be adjustable or variable as shown to facilitate changing the impedance presented by the phase shifter 516/527 as can be appreciated.

Figure 18:
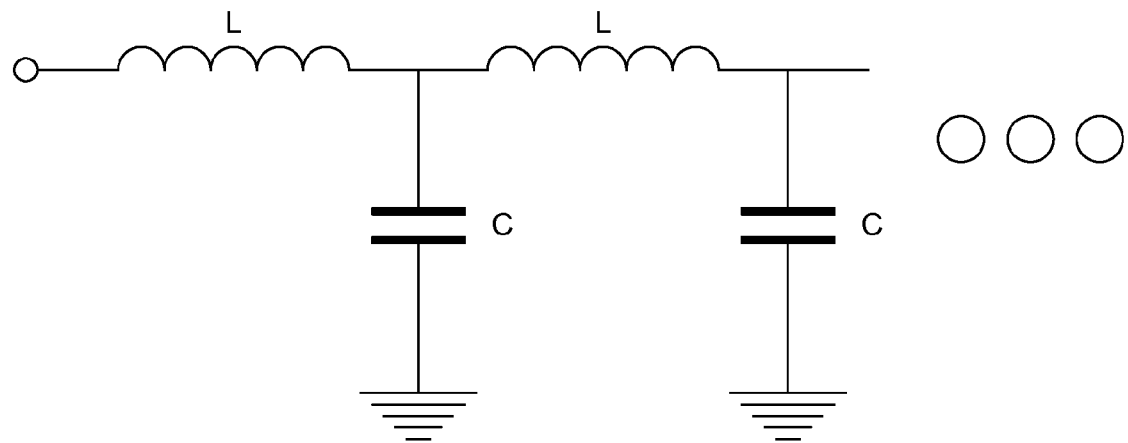
FIG. 18 is a schematic of cascaded second order low pass filter cells of the power multiplying network, for example, of FIG. 8 according to various embodiments.

Referring next to FIG. 18, shown is an example of cascaded second order low pass filter cells (LPF cells), each LPF cell comprising an inductor L and a capacitor C. Referring back to FIG. 8, the power multiplying network 203 actually comprises a series of cascaded LPF cells in a multiply-connected structure. According to various embodiments, as will be described in greater detail, each LPF cell in the power multiplying network 203 may be replaced with an active filter circuit.

Figure 19:
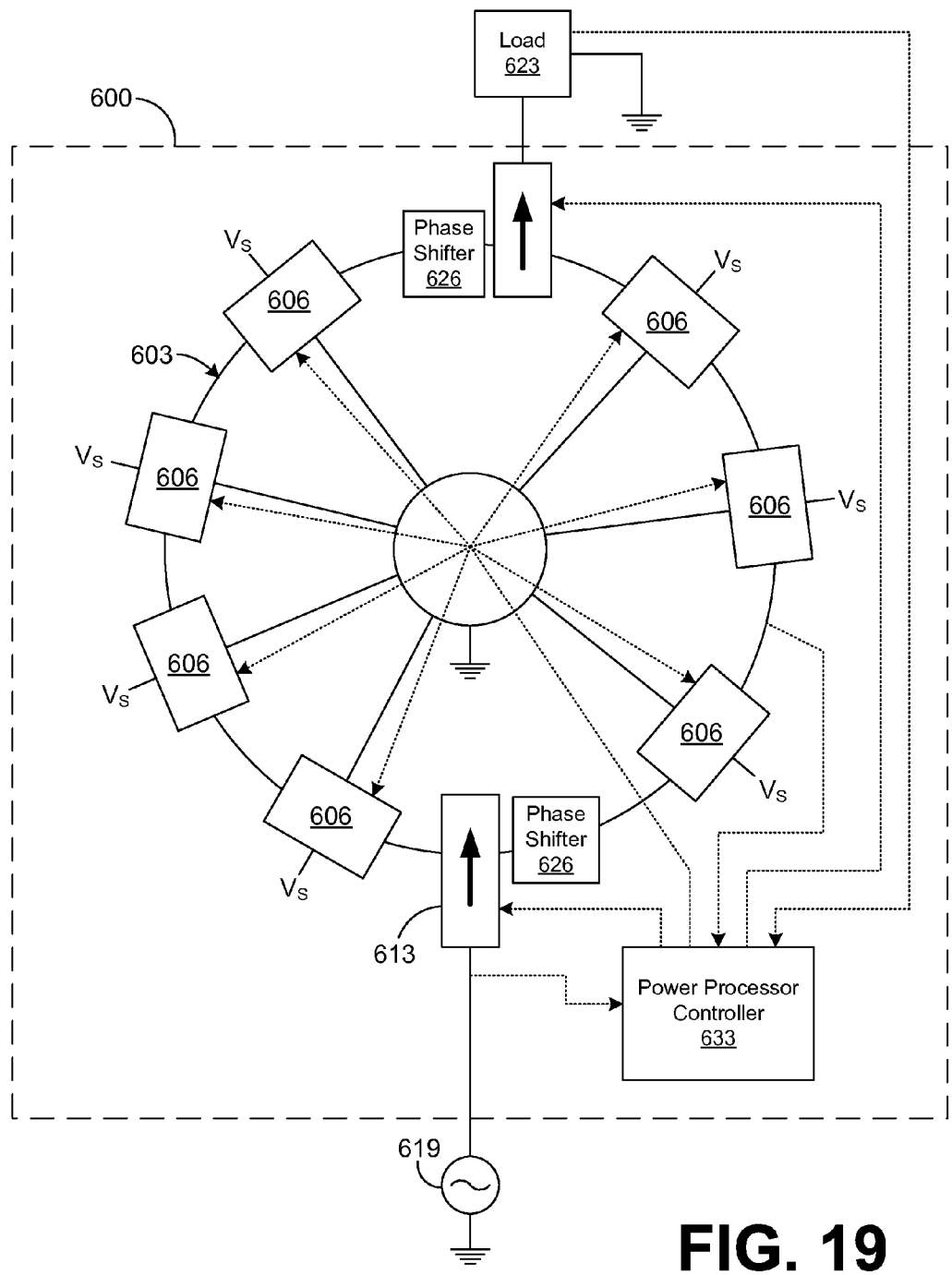
FIG. 19 is a schematic of another example of a multiply-connected power processor according to another embodiment.

Referring then to FIG. 19, shown is a multiply-connected power processor 600 according to various embodiments. The multiply-connected power processor 600 comprises a power processing network 603 that comprises a plurality of cascaded active circuits 606. Each of the active circuits 606 mimic a passive circuits such as the LPF cells mentioned above. Specifically, the active circuits 606 may each mimic an LPF cell, for example, or other passive circuit inherent in the power multiplying network 203 (FIG. 8).

The multiply-connected power processor 600 includes a source coupling 613 and a load coupling 616. The source coupling 613 couples an AC power source 619 to the power processing network 603. The AC power source 619 may operate at power frequencies (i.e. 50 Hz., 60 Hz., 400 Hz.) or any other frequency for which the multiply-connected power processor 600 is designed. Similarly, the load coupling 616 couples the electrical load 623 to the power processing network 603. The source coupling 613 couples AC power from the AC power source 619 into the multiply-connected power processor 600 in a manner similar to the couplers described above. Similarly, the load coupling 616 diverts AC power out of the power processing network 603 to the electrical load 623. Associated with the source coupling 613 and the load coupling 616 is a phase shifter 626 that may be employed to adjust the impedance presented by the source and load couplings 613 and 616 as seen by the power processing network 603 in order to ensure that the electrical length of the power processing network 603 is a multiple of the wavelength of a power signal at the operating frequency of the multiply-connected power processor 600. A power source $V_S$ is applied as the active circuit 606. The power source $V_S$ is essentially the same as the power sources $V_S$ described above with respect to the multiply-connected power processor 500 (FIG. 13).

The multiply-connected power processor 600 further includes a power processor controller 633 that receives various inputs and generates various outputs to control the operation of the multiply-connected power processor 600. In particular, the power processor controller 633 receives an input from the power processing network 603 that indicates the magnitude of the power stored within the power processing network 603 at any given moment. Also, the power processor controller 633 receives an input indicating a magnitude of the voltage at the input port of the source coupling 613 that indicates a state of the AC power generated by the AC power source 619. This input informs the power processor controller 633 of the existence of blackouts, brownouts, voltage surges, voltage sags, transient voltages, and other anomalies experienced in the AC power received by the multiply-connected power processor 600. The power processor controller 633 further receives an input indicating a state of the load 623.

During operation of the multiply-connected power processor 600, the power processor controller 633 may be configured for various different modes of operation depending upon the purpose of the multiply-connected power processor 600. To this end, the power processor controller 633 reacts to one or more of the inputs to control the operation of the multiply-connected power processor 600. For example, the power processor controller 633 can control various components of the multiply-connected power processor 600 in order to vary the power flowing to the load 623, and/or to vary the amount of power stored in the power processing network 603. The total amount of power stored in the power processing network 603 is limited by the current carrying capacity or power rating of the active circuits 606 which can otherwise become saturated as can be appreciated.

In order to control the level of power stored in the power processing network 603, the power processor controller 633 includes outputs to control the operation of the source coupling 613, the amplifier gain of the active circuits 606, and the operation of the load coupling 616. By virtue of the control signal generated by the power processor controller 633 and applied to the source coupling 613, the power processor controller 633 controls the rate at which power is coupled into the power processing network 603. Also, a second control signal generated by the power processor controller 633 and applied to the source coupling 613 controls the rate at which power is coupled into the power processing network 603. The power processor controller 633 generates a control signal that is applied to each of the active circuits 606 to dynamically control an amplifier gain of the active circuits 606. When controlling the amplifier gain of the active circuits 606, such circuits are controlled so as to operate in a linear range to avoid saturation as can be appreciated.

Assuming that the multiply-connected power processor 600 is employed as an uninterruptible power supply, for example, then the power processor controller 633 may act to ensure that a minimum amount of power is stored in the power processing network 603 at any given time. Assuming, for example, that the power supply $V_S$ comprises DC batteries, the power processor controller 633 is configured to ensure that a clean power signal is applied to the electrical load 623 from the load coupling 616. To the extent that the electrical load 623 increases at any given time, then the power processor controller 633 may increase the amount of power coupled into the power processing network 603 by virtue of control of the source coupling 613 to ensure that an adequate amount of power is applied to the electrical load 623 while, at the same time, maintaining a desired power level in the power processing network 603.

In the event that the AC power source 619 is lost, then the power processor controller 633 may increase the amplifier gain of the active circuits 606, thereby drawing power from the DC batteries or other power source in order to maintain the desired level of power within the power processing network 603. Of course, if the battery source $V_S$ is depleted and the AC power source 619 remains in a blackout state, then it is possible that the multiply-connected power processor 600 may run out of power to supply the electrical load 623.

The multiply-connected power processor 600 also acts as a narrow band pass filter at the power frequency for which it is designed. Specifically, given that the active circuits 606 synthesize a passive lumped element circuits in the power processing network 603, then the power processing network 603 is a resonant circuit with a resonant frequency at the frequency of the power signal for which it is designed as described above. As such, the power processing network 603 acts as a narrow band-pass filter at its resonant frequency. Consequently, signals imposed on a power signal from the AC power source 619 such as high frequency voltage transients and the like that enter the power processing network 603 through a source coupling 613, for example, are dissipated in the power processing network 603. The energy associated with such transients or other anomalies may be lost as heat or may be transformed into the power signal propagating in the power processing network 603.

In addition, short term brownouts or voltage sags that last a few cycles of the power signal from the AC power source 619 may be compensated for using power stored in the power processing network 603 at any given time. Also, the power processor controller 633 may be configured to respond to such anomalies by increasing the amplifier gain of the active circuit 606 during the duration of such anomalies so as to maintain a constant power level within the power processing network 603 in spite of a temporary short term loss of the AC power source 619 or upon experiencing a voltage sag in such power source.

Thus, by virtue of the power storage characteristics, the resonant nature of the power processing network 603, and the ability to vary the amplifier gain of the active circuit 606, the multiply-connected power processor 600 may provide clean power to the electrical load 623 without interruption even when the AC power source 619 experiences brownouts, voltage sags, voltage surges, transient voltages, and other problems.

In addition, it may be the case that voltage surges occur in the AC power applied to the source coupling 613. The power processor controller 633 may be configured to maintain the power level in the power processing network 603 under its the maximum power storage capacity. This would allow for room to absorb voltage surges experienced in the AC power source into the power processing network 603. Also, the source coupling 613 may be controlled to reduce the rate that power enters the power processing network 603 upon detection of a voltage surge to ensure that the power level within the power processing network 603 does not exceed the maximum capacity of the power processing network 603. Also, the load coupling 616 may be controlled to ensure that the power directed to the electrical load 623 substantially equals the power demand of the electrical load 623 at any given instant.

Still further, the multiply-connected power processor 600 may be employed in another application as a node to supply the input of power of a structure such as a building, residence, or other structure. In such an embodiment, the power source $V_S$ may be supplied by a renewable source such as, for example, solar panels, windmills, or other source. In such case, it may be desirable to maximize the amount of power from such renewable sources. To this end, the power processor controller 633 may increase the amplifier gain of the active circuits 606 to maximize the amount of power generated in the power processing network 603 from the renewable source, thereby minimizing the amount of power coupled into the power processing network 603 from the AC power source 619.

In this respect, the multiply-connected power processor 600 provides a degree of flexibility in that the AC power source 619 may be drawn upon only as needed in situations where such renewable sources may be somewhat unreliable. For example, cloud cover may inhibit the effectiveness of solar cells from time to time, or windmills may sit still due to a lack of wind. In this respect, the multiply-connected power processor 600 may be employed to reduce reliance upon fossil fuels such as coal burned in coal fired generating stations and the like as can be appreciated. Further, if high efficiency operational amplifiers are employed within the active circuit 606, it is possible that a greater amount of power may be captured from the renewable voltage source $V_S$ than would be captured by traditional DC to AC conversion circuits.

In addition, several AC power sources may be coupled to the multiply-connected power processor 600. Such AC power sources may include the AC power generation source 619 or other sources. For example, other source couplings 613 may be employed to couple other AC power sources to the power processing network 603. Such other AC power generation sources may comprise, for example, windmills, portable generators, or other types of power generation sources as can be appreciated. The power processing network 603 provides for a degree of isolation between the AC power source 619 and other power sources coupled thereto through other source couplings 613. In this respect, once a power signal enters the power processing network 603, it is effectively decoupled from the power generating source 619 that originally generated such signal. As such, the power processing network 603 offers a degree of electrical isolation between power sources coupled to the power processing network 603 through source couplings 613.

For example, given that the power signal in the power processing network 603 is independent of the AC power signal generated by the AC power source 609, then any other power generating source coupled to the power processing network 603 by a source coupling 613 need only be synchronized with the power signal that travels around the power processing network 603. That is to say, once a power signal propagates through the power processing network 603, it propagates through the power processing network 603 independent of the power generating source. As such, the power signal can provide an independent reference for frequency synchronization for any other power source coupled to the power processing network 603. Stated another way, the power signal propagating around the power processing network 603 becomes a frequency reference for power sources coupled thereto rather than the signal generated by any one power source.

This ultimately will minimize any negative effect on frequency synchronization that a secondary power source may have on the operation of a AC power generation source 619. This reflects the fact that for a given power grid, secondary sources of power generation cannot make up more than 20 to 25 percent of the total generation on the grid without negatively affecting the ability to maintain frequency synchronization. However, the multiply-connected power processor 600 allows secondary sources to be coupled thereto to supply power to the load 623 without negatively affecting potential frequency synchronization on a power grid coupled to the multiply-connected power processor 600.

Rather, such secondary generation sources coupled to the power processing network 603 need only be synchronized with the signal as it travels around the power processing network 603 independent of the signal generated by the AC power generation source 609 that has not yet entered the power processing network 603.

Further, the impedance synthesized by the active circuits 606 may be varied parametrically by varying components such as capacitances associated with such active circuits as can be appreciated.

Figure 20:
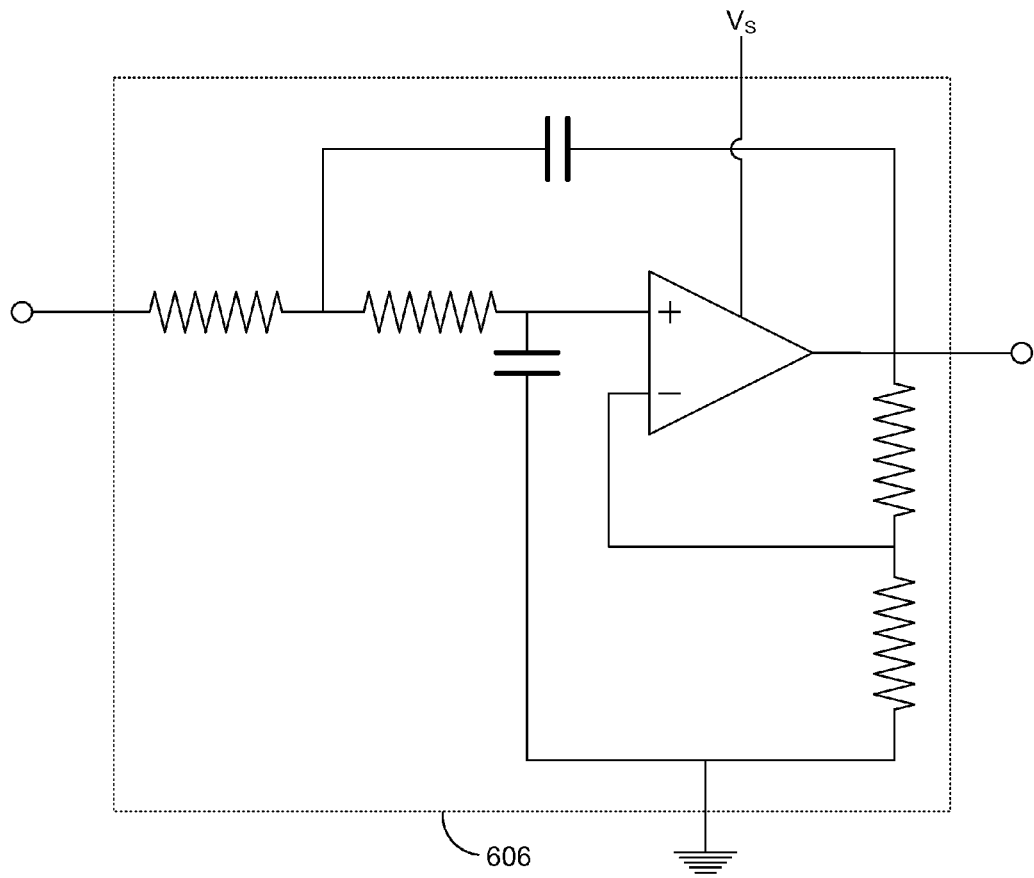
FIG. 20 is a schematic of an active circuit employed in the multiply-connected power processor of FIG. 19 according to one embodiment.

With reference to FIG. 20, shown is one example of an active circuit 606 according to various embodiments. The active circuit 606 depicted in FIG. 20 comprises a Sallen-Key active filter. The Sallen-Key filter is but one of many different types of circuit configurations that may be employed as active circuits 606 according to the various embodiments. For example, other common circuit configurations that may be employed as the active circuits 606 include, for example, Butterworth, Bessel, Chebyshev, State-Variable, Generalized Impedance Converter (GIC) filters, and many other circuit configurations.

Figure 21:
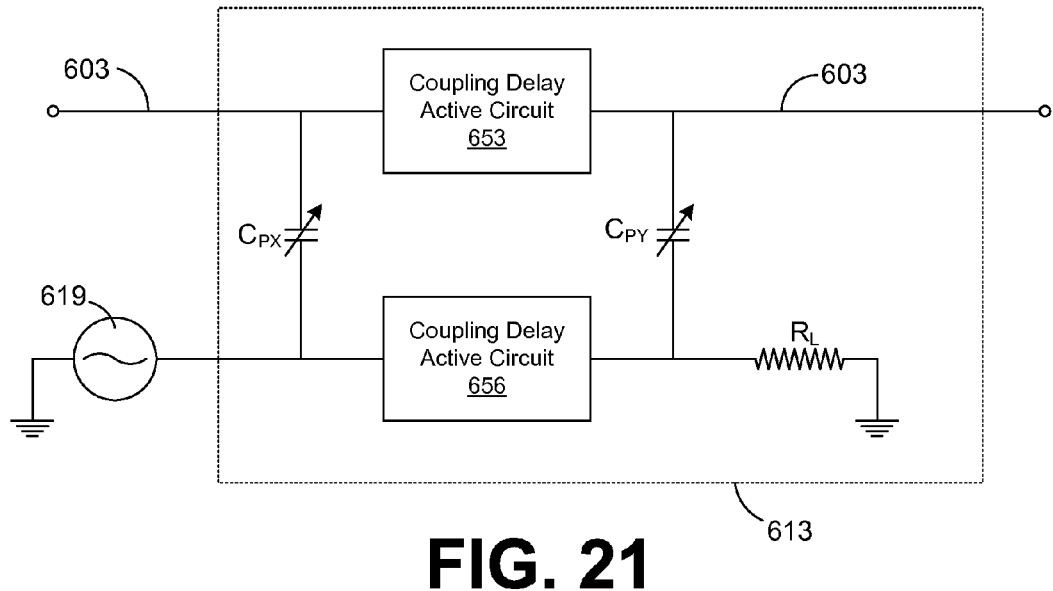
FIG. 21 is a schematic of one example of a source coupling employed in the multiply-connected power processor of FIG. 19 according to one embodiment.

With reference to FIG. 21, shown is one example of the source coupling 613. As shown, the source coupling includes coupling delay active circuits 653 and 656. The coupling delay active circuits 653 and 656 provide a quarter wavelength delay for the power signal generated by the AC power source 619 as described above. Also, the coupling capacitors $C_{PX}$ and $C_{PY}$ are variable capacitors that are controlled by the power processor controller 633 to control a rate at which power enters the power processing network 603 from the AC power source 619.

Figure 22:
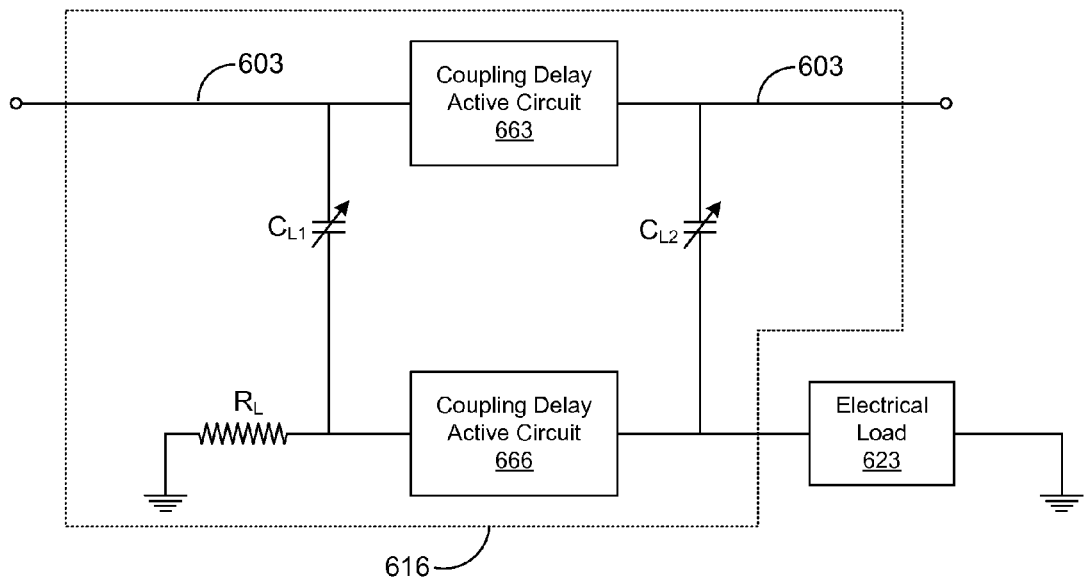
FIG. 22 is a schematic of one example of a load coupler employed in the multiply-connected power processor of FIG. 19 according to one embodiment.

With reference to FIG. 22, shown is an example of the load coupling 616 that is controlled by the power processor controller 633 to determine the rate at which power is diverted from the power processing network 603 to the electrical load 623 (FIG. 19). The load coupling 616 includes the coupling delay active circuits 663 and 666 that provide the quarter wavelength delay of the power signal in order to facilitate the directional coupler capability of the load coupling 616. Similarly, the load coupling 616 includes the coupling capacitors $C_{L1}$ and $C_{L2}$ that are controlled by the power processor controller 633 to determine the rate at which power exits the power processing network 603 and is diverted to the load 623.

With reference to FIGS. 21 and 22, the coupling delay active circuits 653, 656, 663, and 666 each comprise active circuits such as the active circuits 606 as described above and synthesize passive impedances as described above. Thus, the size of the source coupling 613 and the load coupling 616 are reduced accordingly.

Figure 23:
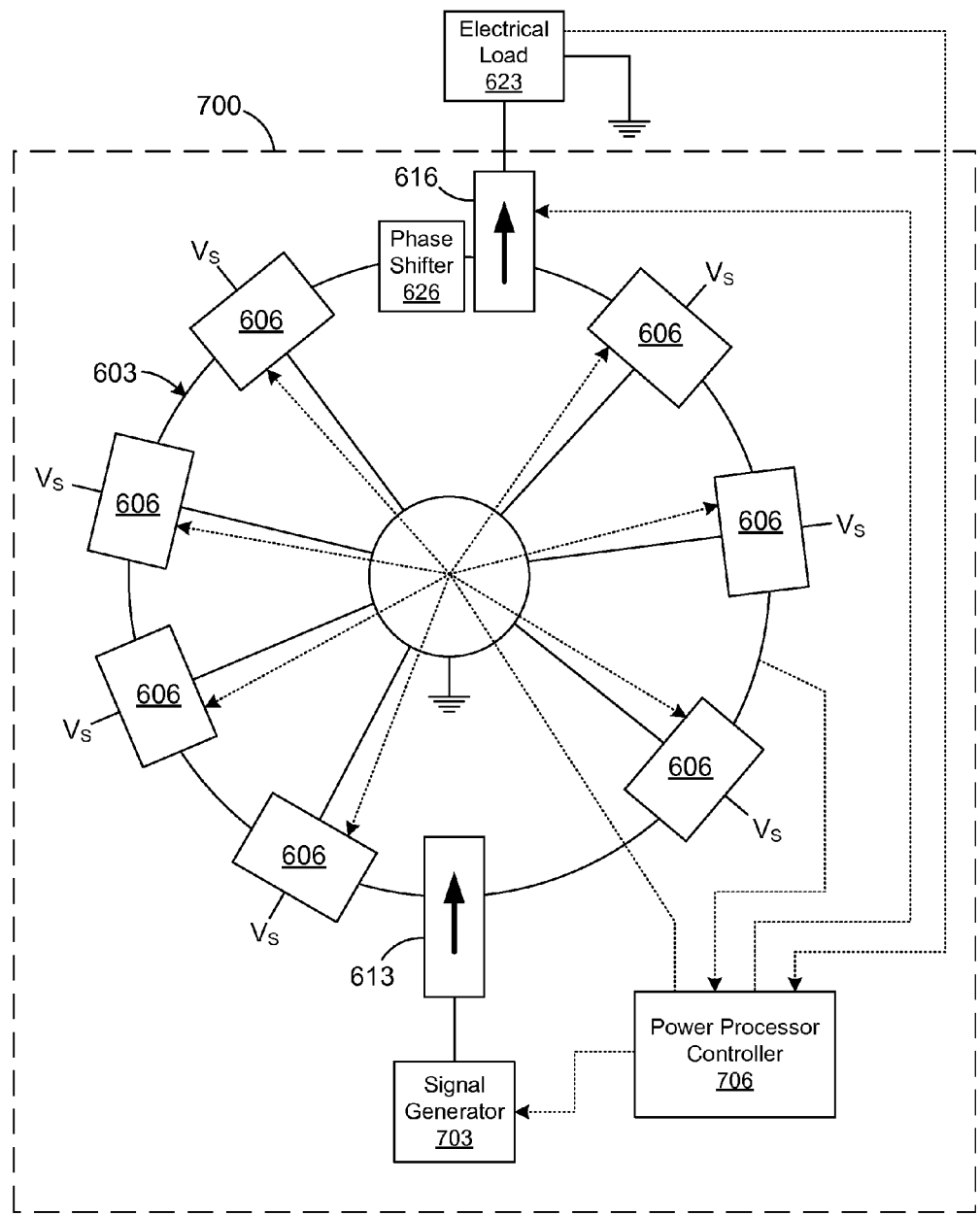
FIG. 23 is a schematic of another example of a multiply-connected power processor employed for power or frequency conversion according to various embodiments.

With reference to FIG. 23, shown is a multiply-connected power processor 700 according to various embodiments that is employed for the conversion of DC power to AC power, or for the conversion of an AC power signal from one frequency to another.

The multiply-connected power processor 700 includes essentially the same components of the multiply-connected power processor 600 described above with reference to FIG. 19. However, the multiply-connected power processor 700 further includes a signal generator 703 that is coupled to the power processing network 603 via the source coupling 613.

The signal generator 703 is configured to generate a signal at a desired frequency such as a power frequency or any other frequency for which the multiply-connected power processor 700 is designed. The signal generated by the signal generator 703 is employed to "seed" or prime a power signal in the power processing network 603. The signal generated by the signal generator 703 is coupled into the power processing network 603 by the source coupling 703. As the signal propagates around the power processing network 603, the amplifier gain of the active circuits 606 is controlled by the power processor controller 633 to amplify the signal so that a desired power level in the power processing network 603 is achieved. Once the power signal is established around the power processing network 603, then the signal generator 703 may be turned off.

When power is diverted to the electrical load 623 via the load coupling 616, the power processor controller 633 responds by increasing the amplifier gain to maintain the power level within the power processing network 603 at a desired constant level. Where the power source $V_S$ comprises a DC power source, the multiply-connected power processor 700 may be employed as an AC to DC converter without typical AC to DC conversion circuitry. Where the power source $V_S$ comprises an AC source, the multiply-connected power processor 700 can be employed for frequency conversion where the frequency of the power source $V_S$ differs from the resonant frequency of the multiply-connected power processor 700. To increase the efficiency of the multiply-connected power processor 700, high efficiency operational amplifiers may be employed.

The power processor controller 706 is configured to monitor the electrical load 623 and the level of power in the power processing network 603 and control the amplifier gain of the active circuits 606 and the load coupling 616 to generate and divert the proper level of power to the electrical load 623. The power processor circuit 706 further controls the signal generator 703 to generate a signal to seed or prime a signal in the power processing network 603 during startup as described above.

It should be emphasized that the above-described embodiments of the present invention are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

Therefore, having thus described the invention, at least the following is claimed:

1. An apparatus, comprising:
   a multiply-connected velocity inhibiting circuit;
   at least one active circuit in the multiply-connected velocity inhibiting circuit, the at least one active circuit synthesizing at least one passive lumped element in the multiply-connected velocity inhibiting circuit;
   a source coupler coupling an alternating current (AC) power source to the multiply-connected velocity inhibiting circuit;
   a control circuit coupled to the source coupler, the control circuit being configured to control a rate at which an AC power from the AC power source enters the multiply-connected velocity inhibiting circuit; and
   wherein the control circuit receives an input signal that indicates a state of a power voltage of the AC power from the AC power source, where the control circuit determines the rate at which the AC power from the AC power source enters the multiply-connected velocity inhibiting circuit based at least in part upon the input signal.

2. The apparatus of claim 1, further comprising at least one direct current (DC) power source coupled to the at least one active circuit.

3. The apparatus of claim 1, further comprising at least one alternating current (AC) power source coupled to a power input of the at least one active circuit.

4. The apparatus of claim 1, wherein the control circuit is further coupled to the at least one active circuit, the control circuit dynamically controlling a gain of the at least one active circuit.

5. The apparatus of claim 1, further comprising a load coupler coupling an electrical load to the multiply-connected velocity inhibiting circuit.

6. The apparatus of claim 5, wherein the control circuit is coupled to the load coupler, the control circuit being configured to control a rate at which the AC power is diverted from the multiply-connected velocity inhibiting circuit to the electrical load.

7. The apparatus of claim 1, wherein the at least one active circuit further comprises a low pass filter.

8. The apparatus of claim 1, wherein the at least one active circuit further comprises a high pass filter.

9. The apparatus of claim 1, wherein the at least one active circuit further comprises an operational amplifier.

10. The apparatus of claim 1, wherein the at least one active circuit further comprises a gyrator.

11. The apparatus of claim 1, wherein the at least one active circuit synthesizes a floating inductance.

12. The apparatus of claim 11, wherein the floating inductance comprises at least one gyrator.

13. The apparatus of claim 1, wherein the at least one active circuit synthesizes a floating parametric inductance.

14. The apparatus of claim 1, wherein the at least one active circuit further comprises at least one gyrator coupled to a capacitance, where the capacitance is time-varying.

15. The apparatus of claim 1, wherein the at least one active circuit synthesizes a parametric reactance.

16. The apparatus of claim 1, wherein the at least one active circuit further comprises a variable gain.

17. The apparatus of claim 16, wherein the control circuit controls the variable gain of the at least one active circuit.

18. An apparatus, comprising:
    a multiply-connected velocity inhibiting circuit;
    at least one active circuit in the multiply-connected velocity inhibiting circuit, the at least one active circuit synthesizing at least one passive lumped element in the multiply-connected velocity inhibiting circuit;
    a load coupler coupling an electrical load to the multiply-connected velocity inhibiting circuit;
    a control system coupled to the load coupler, the control system being configured to control a rate at which an alternating current (AC) power is diverted from the multiply-connected velocity inhibiting circuit to the electrical load; and
    wherein the control system receives an input signal from the electrical load, the input signal indicating a magnitude of the electrical load, where the control system determines the rate at which the AC power is diverted from the multiply-connected velocity inhibiting circuit to the electrical load based at least in part upon the input signal.

19. A method, comprising the steps of:
    propagating a power signal in a multiply-connected velocity inhibiting circuit;
    synthesizing at least one passive lumped element in the multiply-connected velocity inhibiting circuit using at least one active circuit;
    directing alternating current (AC) power into the multiply-connected velocity inhibiting circuit from an AC power source; and
    determining a rate at which the AC power from the AC power source enters the multiply-connected velocity inhibiting circuit based at least in part upon an input signal that indicates a state of a power voltage of the AC power from the AC power source.

20. The method of claim 19, further comprising the step of applying direct current (DC) power to the at least one active circuit from at least one DC power source.

21. The method of claim 19, further comprising the step of applying alternating current (AC) power to the at least one active circuit from at least one AC power source.

22. The method of claim 19, further comprising the step of diverting the AC power out of the multiply-connected velocity inhibiting circuit to an electrical load.

23. The method of claim 19, wherein the at least one passive lumped element is synthesized by an active circuit that comprises a low pass filter.

24. The method of claim 19, wherein the at least one passive lumped element is synthesized by an active circuit that comprises a high pass filter.

25. The method of claim 19, wherein the at least one passive lumped element is synthesized by an active circuit that comprises an operational amplifier.

26. The method of claim 19, wherein the at least one passive lumped element is synthesized by an active circuit that comprises a gyrator.

27. The method of claim 19, wherein the at least one active circuit synthesizes a floating inductance.

28. The method of claim 27, wherein the floating inductance is synthesized by at least one gyrator.

29. The method of claim 19, wherein the at least one active circuit synthesizes a floating parametric inductance.

30. The method of claim 19, wherein the at least one active circuit further comprises at least one gyrator coupled to a capacitance, the method further comprising the step of varying the capacitance over time.

31. The method of claim 19, wherein the at least one active circuit synthesizes a parametric reactance.

32. A system, comprising:
a multiply-connected velocity inhibiting circuit; and
means for synthesizing at least one passive lumped element comprising a parametric reactance in the multiply-connected velocity inhibiting circuit.

* * * * *